United States Patent
Heineman et al.

(10) Patent No.: US 8,237,423 B2
(45) Date of Patent: Aug. 7, 2012

(54) ACTIVE DROOP CURRENT SHARING

(75) Inventors: Douglas E. Heineman, Lakeway, TX (US); Kenneth W. Fernald, Austin, TX (US)

(73) Assignee: Intersil Americas Inc., Milpitas, CA (US)

( * ) Notice: Subject to any disclaimer, the term of this patent is extended or adjusted under 35 U.S.C. 154(b) by 34 days.

(21) Appl. No.: 12/505,492

(22) Filed: Jul. 19, 2009

(65) Prior Publication Data
US 2010/0013307 A1 Jan. 21, 2010

Related U.S. Application Data

(60) Provisional application No. 61/082,025, filed on Jul. 18, 2008.

(51) Int. Cl.
*H02J 7/34* (2006.01)
(52) U.S. Cl. .................................... 323/283; 307/151
(58) Field of Classification Search ............... 307/52, 307/151; 323/272, 283; 700/22; 713/300; 710/3
See application file for complete search history.

(56) References Cited

U.S. PATENT DOCUMENTS

| | | | |
|---|---|---|---|
| 5,117,430 A | 5/1992 | Berglund | |
| 5,646,509 A | 7/1997 | Berglund et al. | |
| 5,675,480 A | 10/1997 | Stanford | |
| 5,935,252 A | 8/1999 | Berglund et al. | |
| 6,003,139 A | 12/1999 | McKenzie | |
| 6,079,026 A | 6/2000 | Berglund et al. | |
| 6,199,130 B1 | 3/2001 | Berglund et al. | |
| 6,262,900 B1 | 7/2001 | Suntio | |
| 6,396,167 B1 | 5/2002 | Simburger et al. | |
| 6,396,169 B1 | 5/2002 | Voegeli et al. | |
| 6,421,259 B1 | 7/2002 | Brooks et al. | |
| 6,470,382 B1 | 10/2002 | Wang et al. | |
| 6,563,294 B2 | 5/2003 | Duffy et al. | |
| 6,709,277 B2 | 3/2004 | Ruttan et al. | |
| 6,754,720 B1 | 6/2004 | Packer | |
| 6,788,035 B2 | 9/2004 | Bassett et al. | |
| 6,894,468 B1 | 5/2005 | Bretz et al. | |

(Continued)

FOREIGN PATENT DOCUMENTS
WO 02/31943 A2 4/2002

OTHER PUBLICATIONS

Juanjuan Sun, Dynamic Performace Analyses of Current Sharing Control for DC/DC Converter, 2007, Dissertation submitted to the Faculty of the Virginia Polytechnic Institute, pp. 23-24.*

(Continued)

*Primary Examiner* — Daniel Cavallari
(74) *Attorney, Agent, or Firm* — Meyertons Hood Kivlin Kowert & Goetzel, P.C.; Jeffrey C. Hood

(57) ABSTRACT

Point-of-load (POL) regulators may be configured as multiphase POL DC-to-DC (direct current to direct current) converters, operating in a multiphase configuration in order to boost the total current available to a system. Current balancing may be performed by utilizing an active low bandwidth current sharing algorithm that uses matched artificial line resistance (droop resistance) while maintaining multi-loop stability during both steady-state and dynamic transient states. The current sharing algorithm may be facilitated through digital communication between the devices, where the digital bus may be a single wire bus, a parallel bus or a clock-and-data bus.

13 Claims, 22 Drawing Sheets

U.S. PATENT DOCUMENTS

| | | | |
|---|---|---|---|
| 6,915,440 B2 | 7/2005 | Berglund et al. | |
| 6,930,893 B2 | 8/2005 | Vinciarelli et al. | |
| 6,936,999 B2 | 8/2005 | Chapuis | |
| 6,944,686 B2 | 9/2005 | Naruse et al. | |
| 6,949,916 B2 | 9/2005 | Chapuis | |
| 6,965,502 B2 | 11/2005 | Duffy et al. | |
| 7,000,122 B2* | 2/2006 | Zafarana et al. | 713/300 |
| 7,000,125 B2 | 2/2006 | Chapuis et al. | |
| 7,049,798 B2 | 5/2006 | Chapuis et al. | |
| 7,080,265 B2 | 7/2006 | Thaker et al. | |
| 7,082,485 B2 | 7/2006 | Ellerbrock et al. | |
| 7,082,488 B2 | 7/2006 | Larson et al. | |
| 7,103,697 B2 | 9/2006 | Scordalakes | |
| 7,174,402 B2 | 2/2007 | Ellerbrock et al. | |
| 7,177,970 B2 | 2/2007 | Kondo et al. | |
| 7,206,944 B2 | 4/2007 | Odaohhara et al. | |
| 7,373,527 B2 | 5/2008 | Chapuis | |
| 7,446,430 B2* | 11/2008 | Leung et al. | 307/38 |
| 2001/0007118 A1 | 7/2001 | Matsuda | |
| 2001/0052762 A1 | 12/2001 | Tsuji | |
| 2003/0070020 A1 | 4/2003 | Kondo et al. | |
| 2003/0142513 A1 | 7/2003 | Vinciarelli | |
| 2003/0191862 A1 | 10/2003 | Greenblat | |
| 2004/0093533 A1 | 5/2004 | Chapuis et al. | |
| 2004/0123164 A1 | 6/2004 | Chapuis et al. | |
| 2004/0123167 A1 | 6/2004 | Chapuis | |
| 2004/0135560 A1 | 7/2004 | Kernahan et al. | |
| 2004/0201279 A1 | 10/2004 | Templeton | |
| 2004/0255070 A1 | 12/2004 | Larson et al. | |
| 2006/0171178 A1* | 8/2006 | Shvarts | 363/65 |
| 2006/0172783 A1 | 8/2006 | Leung et al. | |
| 2006/0172787 A1 | 8/2006 | Ellis et al. | |
| 2006/0276914 A9* | 12/2006 | Templeton | 700/22 |
| 2008/0072080 A1* | 3/2008 | Chapuis et al. | 713/300 |
| 2010/0013304 A1* | 1/2010 | Heineman | 307/31 |
| 2010/0013305 A1* | 1/2010 | Heineman | 307/31 |
| 2010/0013306 A1* | 1/2010 | Heineman et al. | 307/32 |

OTHER PUBLICATIONS

Interview Summary of Oct. 31, 2007, in U.S. Appl. No. 11/198,698, 3 pages.

Final Office Action of Dec. 27, 2007, in U.S. Appl. No. 11/198,698, 30 pages.

Advisory Action of Feb. 19, 2008, in U.S. Appl. No. 11/198,698, 3 pages.

Interview Summary of Jul. 14, 2008, in U.S. Appl. No. 11/198,698, 2 pages.

Office Action of Nov. 13, 2006, in U.S. Appl. No. 11/405,294, 35 pages.

Final Office Action of May 8, 2007, in U.S. Appl. No. 11/405,294, 37 pages.

Office Action of Jul. 25, 2007, in U.S. Appl. No. 11/405,294, 35 pages.

Final Office Action of Dec. 27, 2007, in U.S. Appl. No. 11/405,294, 32 pages.

Advisory Action of Feb. 19, 2008, in U.S. Patent Application No. 11/405,294, 3 pages.

Office Action of Oct. 9, 2007, in U.S. Appl. No. 11/425,489, 35 pages.

Final Office Action of Apr. 4, 2008, in U.S. Appl. No. 11/425,489, 29 pages.

"Calibrate," The Merriam-Webster Dictionary, copyright 2007-2008, Merriam-Webster, Inc., 11th Edition, 4 pages.

U.S. Appl. No. 11/435,629, entitled "Autonomous Sequencing and Fault Spreading", by John A. Wishneusky, filed on May 17, 2006. 42 pages.

U.S. Appl. No. 11/425,489, entitled "Power Management System Using a Multi-Master Multi-Slave BUS and Multi-Function Point-of-Load Regulators", by Kenneth W. Fernald, James W. Templeton, and John A. Wishneusky, filed on Jun. 21, 2006. 48 pages.

U.S. Appl. No. 11/405,294, entitled "Method for Using a Multi-Master Multi-Slave BUS for Power Management", by Kenneth W. Fernald, James W. Templeton, and John A. Wishneusky, filed on Apr. 17, 2006. 40 pages.

U.S. Appl. No. 11/198,698, entitled "Method for Using a Multi-Master Multi-Slave BUS for Power Management", by Kenneth W. Fernald, James W. Templeton, and John A. Wishneusky, filed on Aug. 5, 2005. 36 pages.

U.S. Appl. No. 11/405,293, entitled "Plug-and-Play Point of Load Regulator", by James W. Templeton, filed on Apr. 17, 2006. 35 pages.

U.S. Appl. No. 11/356,674, entitled "Point of Load Regulator Having a Pinstrapped Configuration and Which Performs Intelligent Bus Monitoring", by James W. Templeton, filed on Feb. 17, 2006. 41 pages.

U.S. Appl. No. 10/820,976, entitled "Method and Apparatus for Improved DC Power Delivery, Management and Configuration", by James W. Templeton, filed on Apr. 8, 2004. 37 pages.

V. C. H. Nicholas, C. T. Lau, and B. S. Lee; "A Power LAN for Telecommunication Power Supply Equipment"; IEEE Conference on Computer, Communication, Control and Power Engineering (TENCON, Region 10); Oct. 1993; pp. 24-27; vol. 3; Beijing.

Jerry G. Williford and James T. Dubose; "30 kVA LF/VLF Power Amplifier Module"; IEEE Military Communications Conference (MILCOM '95); Nov. 1995; pp. 748-751, vol. 2.

R. Sebastian, M. Castro, E. Sancristobal, F. Yeves, J. Peire, and J. Quesada; "Approaching hybrid wind-diesel systems and Controller Area Network"; IEEE 28th Annual Conference of the Industrial Electronics Society; Nov. 2002; pp. 2300-2305, vol. 3.

James P. Earle; "IPMI/IPMB Satellite Controller for Power Supply Applications" (Preliminary Specification);C&D Technologies, Inc.; <http://www.cd4power.com/data/apnotes/acan-02.pdf>; 92 pages.

James P. Earle; "IPMI/IMPB Satellite Controller Test Procedure" (Application Guide); C&D Technologies, Inc.; <www.cdpowerelectronics.net/products/appnotes/acan04.pdf>; 12 pages.

"How to Design Battery Charger Applications that Require External Microcontrollers and Related System-Level Issues"; Dallas Semiconductor; <www.maxim-ic.com/appnotes.cfm/appnote_number/680>; Mar. 15, 2000.; 20 pages.

"APC-3000-R Front End AC-DC Power Shelf"; Advanced Power Conversion PLC (Data Sheet); Nov. 2002; 6 pages.

"Providing a DSP Power Solution from 5-V or 3.3-V Only System"; Texas Instruments; <http://focus.ti.com/lit/an/slva069/slva069.pdf>; May 1999; 12 pages.

"HDX-600P Hot Swap—600 Watts—1U High"; Switching Power, Inc.; www.switchpwr.com/hdx-600p.pdf; 2 pages.

"HDSX-600P: I2C Serial Bus Interface (for IPMI implementation):"; Switching Power, Inc.; <www.switchpwr.com/I2C>. pdf; 3 pages.

John M. Hawkins; "Characteristics of automated power system monitoring and management platforms"; Twenty-second International Telecommunications Energy Conference (INTELEC); Sep. 2000; pp. 46-50.

A. Jossen, V. Spath, H. Doring & J. Garche; "Battery Management Systems (BMS) for Increasing Battery Life Time"; The Third International Conference on Telecommunications Energy Special, (TELESCON); May 2000; pp. 81-88; Dresden, Germany.

Tom Lock; "Digitally Controlled Power Systems: How Much Intelligence Is Needed and Where It Should Be"; Twentieth International Telecommunications Energy Conference (INTELEC); 1998; pp. 345-348.

"SPI—APPNOTES: Alarm & Monitoring Signals"; Switching Power Inc.; 2 pages; <www.switchpwr.com/ alarm_signals>.pdf.

"TDA8020HL Dual Smart Card Interface—Objective Specification v4.2—Data Sheet"; Feb. 24, 2001; 22 pages; Philips Semiconductors.

Chrisotphe Chausset; "Application Note—TDA8020HL/C2 Dual Smart Card Interface"; May 20, 2003; 28 pages; Philips Semiconductors.

"Intelligent charge switches for charging circuit applications"; Jul. 2002; 2 pages; Philips Semiconductors; The Netherlands.

"PCF50604 Power Management Unit—2.5G/3G controller for power supply and battery management"; Jul. 2001; 4 pages; Philips Semiconductors; The Netherlands.

John Perzow; "Point-of-load regulation adds flexibility to set-top-box design"; Jun. 27, 2002; pp. 73-80; vol. 47, Part 14; <www.ednmag.com>.

H. Taylor and L.W. Hruska; "Standard Smart Batteries for Consumer Applications" Proceedings of the Tenth Annual Battery Conference on Applications and Advances; Jan. 1995; p. 183; Long Beach, CA, U.S.A.

"3-V to 6-V Input, 6-A Output Tracking Synchronous Buck PWM Switcher with Integrated FETs (Swift™) for Sequencing"; Oct. 2002—Apr. 2005; 21 pages; Texas Instruments Incorporated; <http://focus.ti.com/lit/ds/symlink/tps54680.pdf>.

"Programmable Four-Channel Step-Down DC/DC Converter"; Texas Instruments Incorporated; 2005; 16 pages; <http://focus.ti.com/lit/ds/symlink/tps54900.pdf>.

"LNBH21—LNB Supply and Control IC with Step-up Converter and I2C Interface" (Datasheet); Apr. 2004; 20 pages; STMicroelectronics; <www.st.com/stonline/products/literature/ds/9890.pdf>.

"Smart Battery System Specifications—System Management Bus Specification"; Dec. 11, 1998; 39 pages; SBS Implementers Forum.

"Advanced Configuration and Power Interface Specification"; Feb. 2, 1999; 397 pages; Intel Microsoft Toshiba.

"The I2C-Bus Specification—Version 2.1"; Jan. 2000; 46 pages; Philips Semiconductors.

"User's Guide Agilent Technologies Series 661xxA MPS Power Modules & Model 6001A MPS Keyboard"; Apr. 2000; 55 pages; Agilent Technologies; Malaysia.

Programming Guide Agilent Technologies Series 661xxA MPS Power Modules; Sep. 1997—Apr. 2000; 116 pages; Agilent Technologies.

M. Castro, R. Sebastian, F. Yeves, J. Peire, J. Urrutia and J. Quesada; "Well-Known Serial Buses for Distributed Control of Backup Power Plants. RS-485 versus Controller Area Network (CAN) Solutions"; IEEE 28th Annual Conference of the Industrial Electronics Society (IECON 02); Nov. 2002; pp. 2381-2386; vol. 3.

"Six-Channel Power Supply Supervisor and Cascade Sequence Controller" (Preliminary Information Data Sheet); Summit Microelectronics, Inc.; <www.summitmicro.com/prod_select/summary/sms66/SMS66DS.pdf>; 2003; 26 pages.

"Operating Manual for Internal RS-232 Interface for XT 60 Watt and HPC 300 Watt Series Programmable DC Power Supplies"; 2002; 62 pages; Xantrex Technology Inc.; Burnaby, B.C., Canada.

Paul Birman and Sarkis Nercessian; "Programmable supplies use switch-mode topologies"; Mar. 1995; pp. 33-34; Electronic Products Magazine; Garden City, New York, U.S.A.

A. Akiyama, T. Nakamura, M. Yoshida, T. Kubo, N. Yamamoto and T. Katoh; "KEKB Power Supply Interface Controller Module"; KEK, High Energy Accelerator Research Organization; 4 pages; Japan.

T. T. Nakaura, A. Akiyama, T. Katoh, Ta. Kubo, N. Yamamoto, and M. Yoshida; "Magnet Power Supply Control System in KEKB Accelerators"; International Conference on Accelerator and Large Experimental Physics Control Systems; 1999; pp. 406-408; Trieste, Italy.

"Installation Guide—Agilent Technologies MPS Mainframe Model 66000A"; Apr. 2000; 29 pages; Agilent Technologies; Malaysia.

"Chemistry-Independent Battery Chargers"; Maxim Integrated Products; <http://pdfserv.maxim-ic.com/en/ds/MAX1647-MAX1648.pdf>; 25 pages.; Sunnyvale, CA, U.S.A.

Ron Vinsant, John Difiore and Richard Clarke; "Digitally-controlled SMPS extends power system capabilities"; Powerconversion & Intelligent Motion; 1994; pp. 30-37; vol. 20, No. 6.

Office Action of Aug. 20, 2008, in U.S. Appl. No. 11/425,489, 37 pages.

Office Action of Aug. 19, 2008, in U.S. Appl. No. 11/435,629, 31 pages.

Office Action of Sep. 20, 2006, in U.S. Appl. No. 10/820,976, 19 pages.

Office Action of Feb. 21, 2007, in U.S. Appl. No. 10/820,976, 12 pages.

Final Office Action of Aug. 14, 2007, in U.S. Appl. No. 10/820,976, 12 pages.

Advisory Action of Oct. 26, 2007, in U.S. Appl. No. 10/820,976, 3 pages.

Examiner's Answer of Mar. 18, 2008, in U.S. Appl. No. 10/820,976, 18 pages.

Office Action of Jun. 17, 2008, in U.S. Appl. No. 10/820,976, 13 pages.

Office Action of Jun. 16, 2008, in U.S. Appl. No. 11/405,293, 20 pages.

Office Action of Nov. 8, 2006, in U.S. Appl. No. 11/198,698, 41 pages.

Final Office Action of May 3, 2007, in U.S. Appl. No. 11/198,698, 36 pages.

Interview Summary of May 31, 2007, in U.S. Appl. No. 11/198,698, 4 pages.

Office Action of Jul. 25, 2007, in U.S. Appl. No. 11/198,698, 32 pages.

* cited by examiner

| Bit Size | Function |
|---|---|
| 5 bits | Current Sharing Group ID/Address |
| 3 bits | Number of devices within the group |
| 3 bits | Position or Order number within the Group |
| 1 bit | Add or Drop Phase |
| 1 bit | Autonomous Recovery from Fault |
| 1 bit | Current Sharing Algorithm Enable |

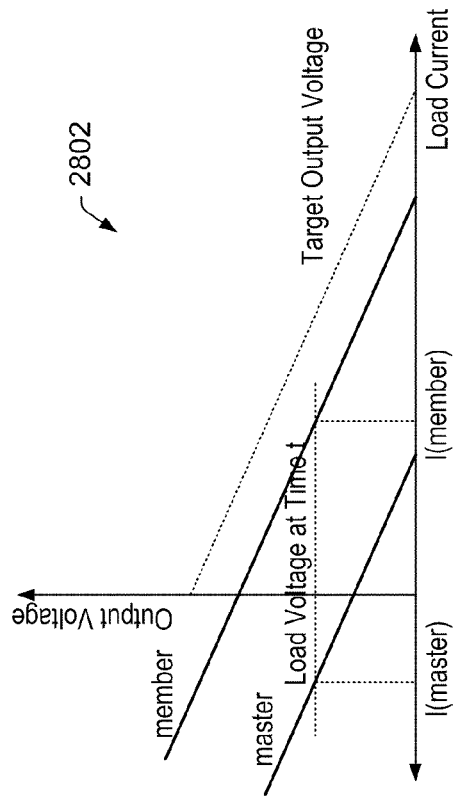
FIG. 28
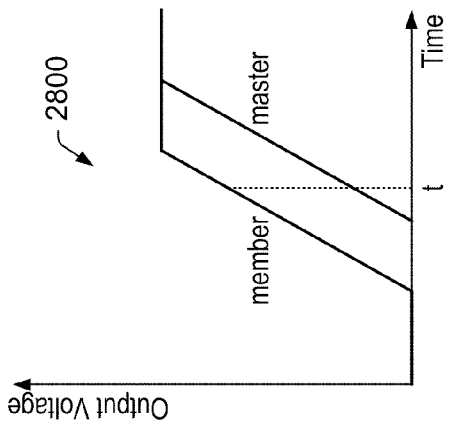
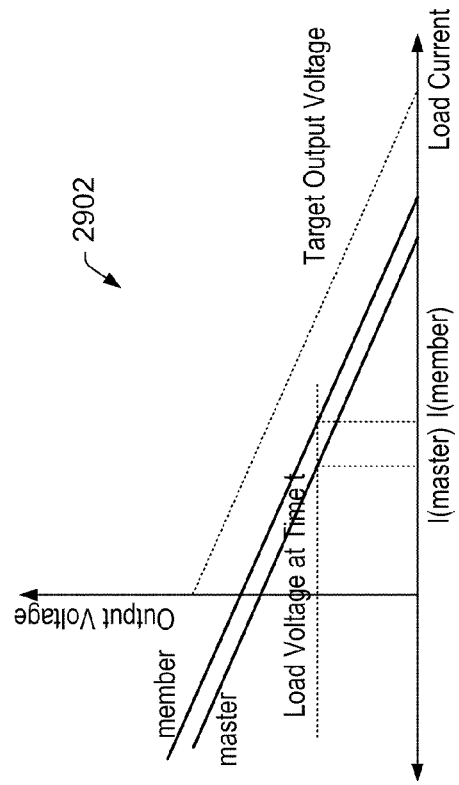
FIG. 29 under US 8,237,423 B2

ACTIVE DROOP CURRENT SHARING

PRIORITY CLAIM

This application claims benefit of priority of provisional application Ser. No. 61/082,025 titled "Device-To-Device Communication Bus and Active Droop Current Sharing for Distributed Power Management", whose inventors are John A. Wishneusky, Douglas E. Heineman, Kenneth W. Fernald, and Nicholas J. Havens, and which was filed Jul. 18, 2008, and is hereby incorporated by reference as though fully and completely set forth herein.

BRIEF DESCRIPTION OF THE DRAWINGS

The foregoing, as well as other objects, features, and advantages of this invention may be more completely understood by reference to the following detailed description when read together with the accompanying drawings in which:

FIG. 28 illustrates the output voltage ramp of a master device and the output voltage ramp of a member/slave device, with the ramp of the member device starting significantly sooner than the ramp of the master device;

FIG. 29 a more desirable load line relationship between the load line of the master device and the load line of the slave device of FIG. 28, with the currents more balanced than in embodiment shown in FIG. 28;

Figure 1:
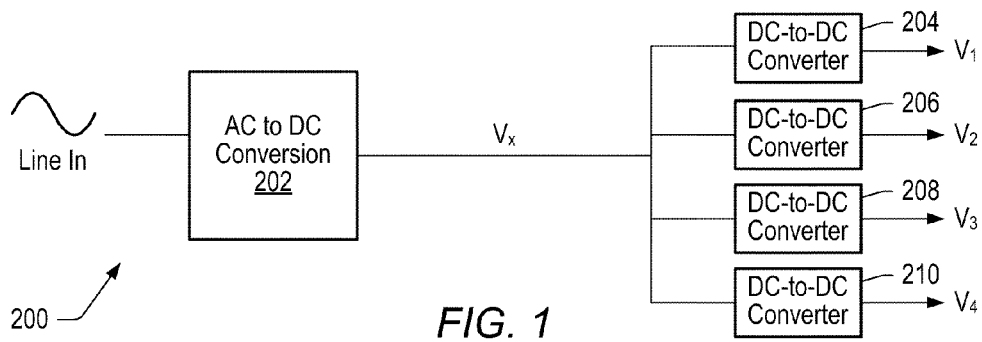
FIG. 1 shows one embodiment of a distributed power architecture (DPA) system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)."

DETAILED DESCRIPTION OF THE PREFERRED EMBODIMENTS

Power supply design has become a critical and difficult task. High-current/low-voltage ICs require a very clean and stable source of DC power. The power source must be capable of delivering very fast current transients. The electronic path to these loads must also have low resistance and inductance (a 1.5V supply would be completely dropped across a 25 mΩ resistance at 60 Amps). Traditionally, DC power supplies were designed to convert AC line voltage to one or more DC outputs that would be routed throughout a system to the points of load. To reduce the ill effects of distributing high current signals around a system, an alternative method of distributing power at modest voltage and current levels has been adopted. Rather than converting an AC supply voltage level to the DC voltage level required by various loads at a central location, the AC supply voltage is typically converted to a "reasonable" DC voltage and routed to the "point of load" (POL), where it is converted locally to the required low voltage. This technique is referred to as "Distributed Power Architecture", or DPA, and is illustrated in FIG. 1. As shown in PDA system 200 of FIG. 1, an AC to DC voltage converter 202 may produce an intermediate DC voltage Vx, which may be routed to individual local DC to DC converters 204, 206, 208, and 210, which in turn may provide the required DC voltages V1, V2, V3, and V4, respectively, to their corresponding POLs. With a DPA, errors may be reduced since the distance traveled by a high-current signal is minimized, thus reducing 1×R (resistive) and L di/dt (inductive) errors. It should be noted that as used herein, the terms "POL converter" and "DC-to-DC converter" are interchangeable, with the understanding that typically in DPA systems power is provided to POLs via DC-to-DC converters.

In many power distribution systems it is typically not enough to just distribute power around a system to the various POLs. Complex electronic systems are generally monitored and controlled to ensure maximum reliability and performance. Some of the more important functions (power supply features) typically implemented in DPA systems are listed below.

Supply Sequencing

A modern electronic system can contain many ICs and each IC can have several supply voltage requirements. For example, core logic may require one voltage and the I/O may require a different voltage. This typically results in a need for setting the order in which the voltages on a single chip are applied and the order in which the chips in a system are powered up.

Ramp Control

It is sometimes necessary to control the rate at which the DC output voltage of a converter ramps from its initial value to its nominal value. This may be done in support of managing a hot-swap event, sequencing requirement or satisfying the requirements of the load.

Tracking

Many times it is desirable to have the output of one more converters follow, or mirror, the output of one or more other converters in the system. Tracking a specific voltage level, for example, may include setting the voltage level of a tracking converter or device to the voltage level of a tracked converter or device, and changing the voltage level of the tracking device to match the voltage level of the tracked device any time the voltage level of the tracked device changes. In some cases the voltage levels of tracking devices and tracked devices may not be the same; changes in the tracked voltage level would simply be mirrored in the voltage output of the tracking devices. For example, if the tracked voltage increases by 0.2V, the tracking voltage would also increase by 0.2V.

Phase Control

DC voltage is typically stepped down in one of two ways, linear regulation and DC-to-DC conversion. DC-to-DC converters may step down DC voltage by pulse width modulation (PWM) of an input voltage and passive filtering of the output. The duty cycle of the PWM signal generally approximates the ratio of output voltage to input voltage divided by the efficiency of the converter. For example, for an ideal DC-to-DC converter with a desired output of 1.2V and an input of 12V, the duty cycle would be 10%. In high current applications, it is often desirable to force the various DC-to-DC converters to sample different "phases" of their clock cycle. That is, to prevent DC-to-DC converters in a system from all sampling the first 10% of a clock cycle, one converter may sample the first 10% of the clock cycle and the next converter may sample a different 10% of the clock cycle, and so on. This typically reduces noise and improves transient response. This technique is also used in motor control and is often implemented to control multiple fans in a system. PWM controlled fans with staggered phase typically offer reduced acoustic noise.

Current Sharing

In addition to forcing DC-to-DC converters to sample staggered phases of the switching clock, it is sometimes desirable to force two or more independent converters to each deliver an equal share of the load current. This approach provides improved noise and transient response in high-current applications.

Synchronization of Switching Clocks

It is often desirable to synchronize the switching frequency of DC-to-DC converters in a system to each other or to some other system clock. This is typically performed to reduce the probability of mixing the clock or its harmonics with important system clocks. It is of particular interest in communication applications.

There are other functions that may be required for power systems. For example, single points of temperature measurement, open/closed status of doors and vibration may be of interest.

In order to accommodate a demand for more power and denser systems and the resulting new distribution problems, many present power distribution schemes began offering multiples of each solution, or functions, in a single package. Typically each of these functions requires a separate configuration within the system. That is, each function may require its own interconnection network tying the POL converters together. The interconnection network may implement glue-logic that may be required for control of the POL converters in order for the particular function to be successfully executed during system operation. Many of these functions comprise analog signal control requiring corresponding analog signal lines, with POL converters interconnected in point-to-point configurations. Routing of such signals is often difficult, while no true communication is established between various POL converters and/or between the POL converters and any other elements of the system.

Figure 2:
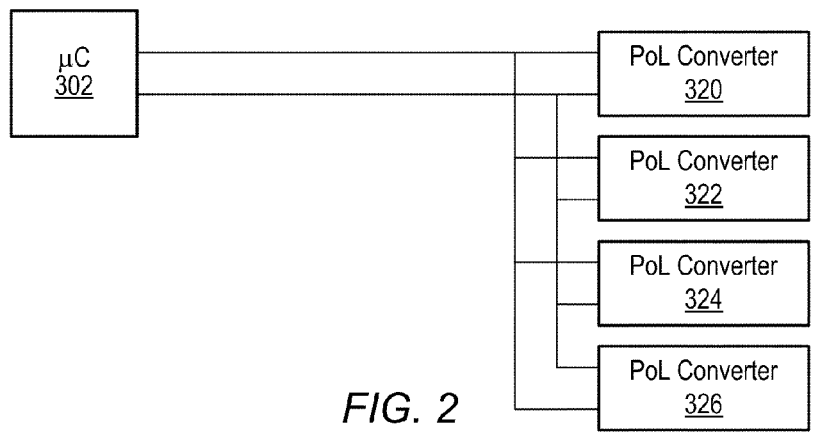
FIG. 2 shows one embodiment of a system in which a microcontroller communicates with POL converter devices over an I²C bus.

In an effort to tie all or most of these functions together at the system level, one approach has been to implement the functions in control ICs responsible for controlling respective POL converters. Some of the functionality may also be programmed into a microcontroller that may communicate with attached POL converters over an I²C (inter-IC communication) bus to coordinate control of all POL converters in the system. FIG. 2 illustrates an example of an I²C-based system. As shown in FIG. 2, a microcontroller 302 may be coupled to POL converters (also referred to as POL regulators) 320, 322, 324, and 326, with the connections between the devices representing an I²C bus. A configuration as shown in FIG. 2 is typically not suited for active control and may be used mainly for status monitoring, where POL converters 320, 322, 324, and 326 may send a status signal back to microcontroller 302, which in turn may send a simple control signal to a respective POL converter based on the status information received from the respective POL converter. In general, microcontroller 302 checks status for one POL converter at a time, which may be viewed as a disadvantage when more interactive, real-time communication is desired in a system.

Figure 3:
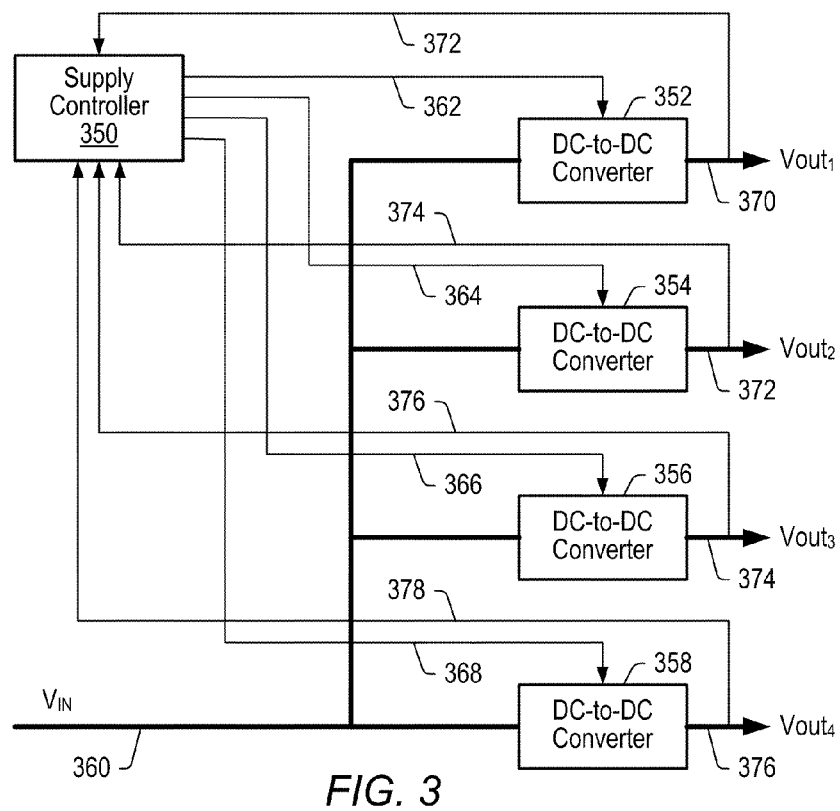
FIG. 3 shows one embodiment of a system in which DC-to-DC voltage converters are interconnected in a point-to-point configuration, controlled by a central supply controller to perform a specific function.

FIG. 3 illustrates one example of a single function implemented in a DPA system. Typically, a supply controller 350 (providing control for executing the function) and DC-to-DC voltage converters 352, 354, 356, and 358 are connected in a point-to-point configuration as shown. Supply controller 350 is coupled to each DC-to-DC converter over dedicated lines, (typically analog lines are used for implementing most functions), more specifically over lines 372 and 362 to converter 352, lines 374 and 364 to converter 354, lines 376 and 366 to converter 355, and lines 378 and 368 to converter 358. Input supply voltage VIN 360 is coupled to each DC-to-DC converter, and in turn DC-to-DC converter 352 may produce, for a respective POL or POLs, DC output voltage 370, DC-to-DC converter 354 may produce DC output voltage 372, DC-to-DC converter 356 may produce DC output voltage 374, and DC-to-DC converter 358 may produce DC output voltage 376.

Figure 4:
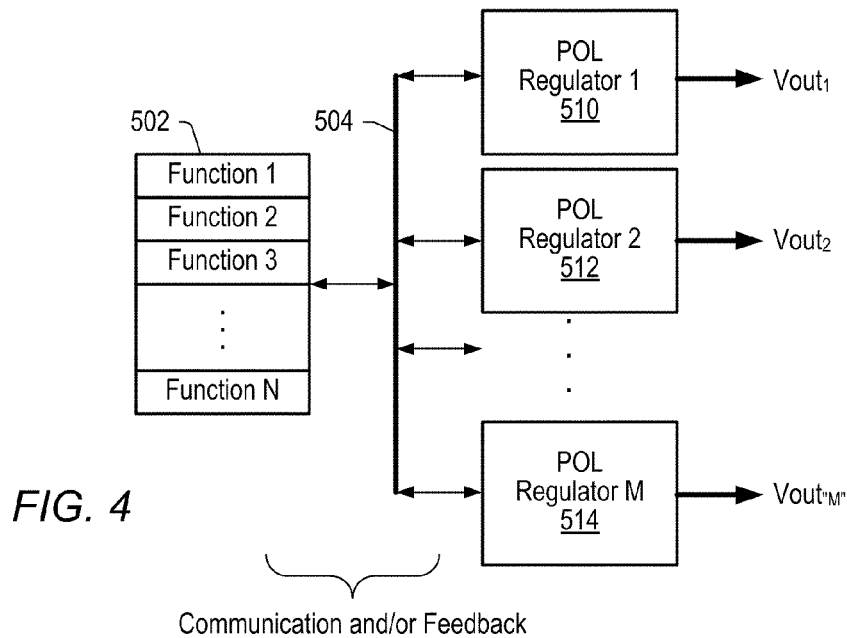
FIG. 4 shows one embodiment of a system in which the common functions required in a complex DC power system are combined in a single controller.

In various embodiments, the common functions required in a complex DC power system may be combined in a single controller rather than treated as separate IC functions. As shown in FIG. 4, a controller 502 managing functions 1 through N may be coupled to POL Regulators 1 through M (illustrated by example as POL regulators 510, 512 and 514) via a digital bus 504. Digital bus 504 may be a serial bus enabling communication with reduced wiring requirements. In the configuration shown in FIG. 4, real-time communication may be made possible between converters 510, 512, and 514 and controller 502 by their being coupled to serial digital bus 504. However, this system may still rely on performing central control of the coupled POL regulators, limiting the response time of each POL regulator when performing shared power functions.

Figure 5:
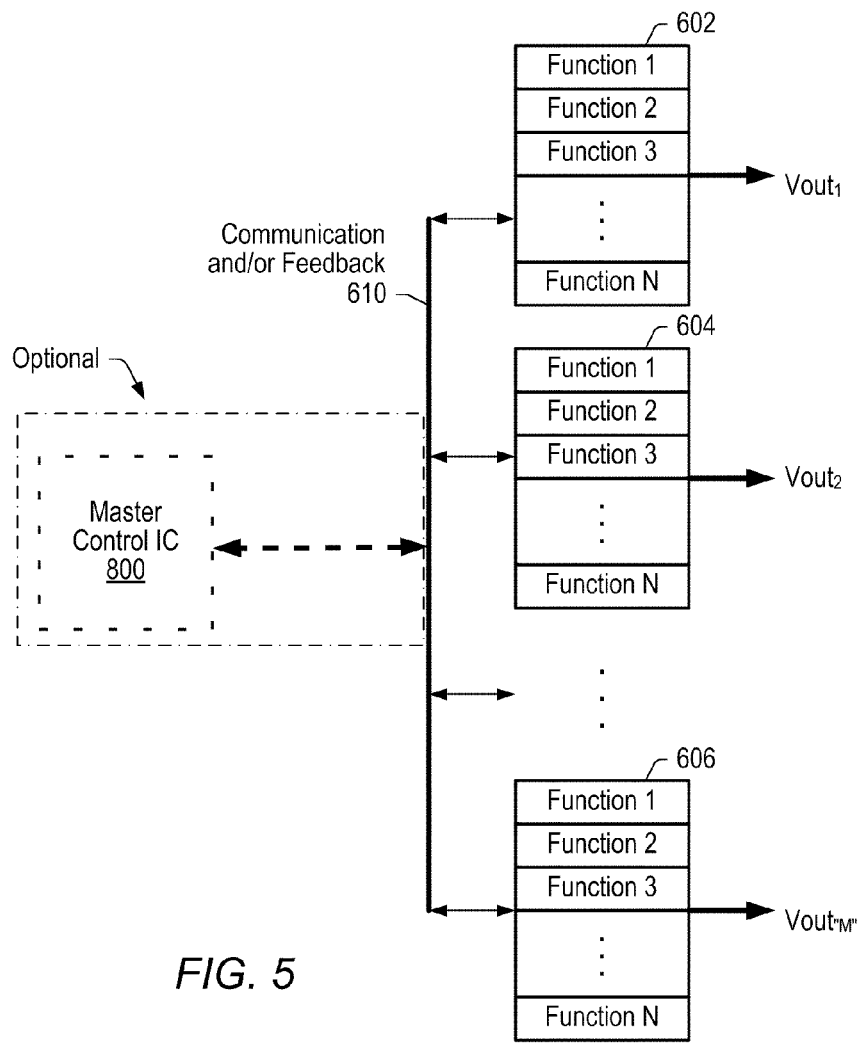
FIG. 5 shows one embodiment of a system of POL regulators configured to communicate with each other over a communication bus.

In one set of embodiments, a system-oriented solution using mixed-signal IC technology may allocate one unit of each function to a single point of load (POL) IC, or POL regulator. In these embodiments, one DC-to-DC voltage converter, one unit of supply sequencing, one unit of load monitoring, and one respective unit of various other power management functions (e.g. the functions discussed above) may be combined in a single POL regulator, as illustrated in FIG. 5. A true system-oriented solution may be implemented through each POL regulator having the ability to communicate with any other POL regulator, and/or with an optional master control IC. As shown in the embodiment illustrated in FIG. 5, POL regulators 602, 604, and 606 have each been allocated Functions 1 through N, and are coupled together via serial digital bus 610. Bus 610 may be simpler than an I²C bus and may offer more control and signaling, including real-time data feedback capability. Bus 610 may also allow each POL regulator to be coupled to a master control IC (MCIC) 800, or to be coupled directly to each other, enabling all system level functions to be configured, controlled and monitored providing simple and flexible results. While FIG. 5 shows an MCIC 800 coupled to bus 610, MCIC 800 is optional and alternate embodiments may omit MCIC 800 and only include POL regulators coupled to bus 610, and all required functions may be controlled by a single POL regulator, or various power management functions may be collectively controlled by a group of POL regulators operating together.

Embodiments of the present invention, as illustrated in FIG. 5, provide a modular approach to designing DPA systems, providing system level functionality without requiring the system to be individually and separately configured for each desired function that may be required. Each POL regulator may be individually configured prior to its being placed in the system, and may operate to perform all necessary functions by having access to real-time feedback information over bus 610, and by communicating with other POL regulators. This represents active control as opposed to simple status monitoring.

Figure 6:
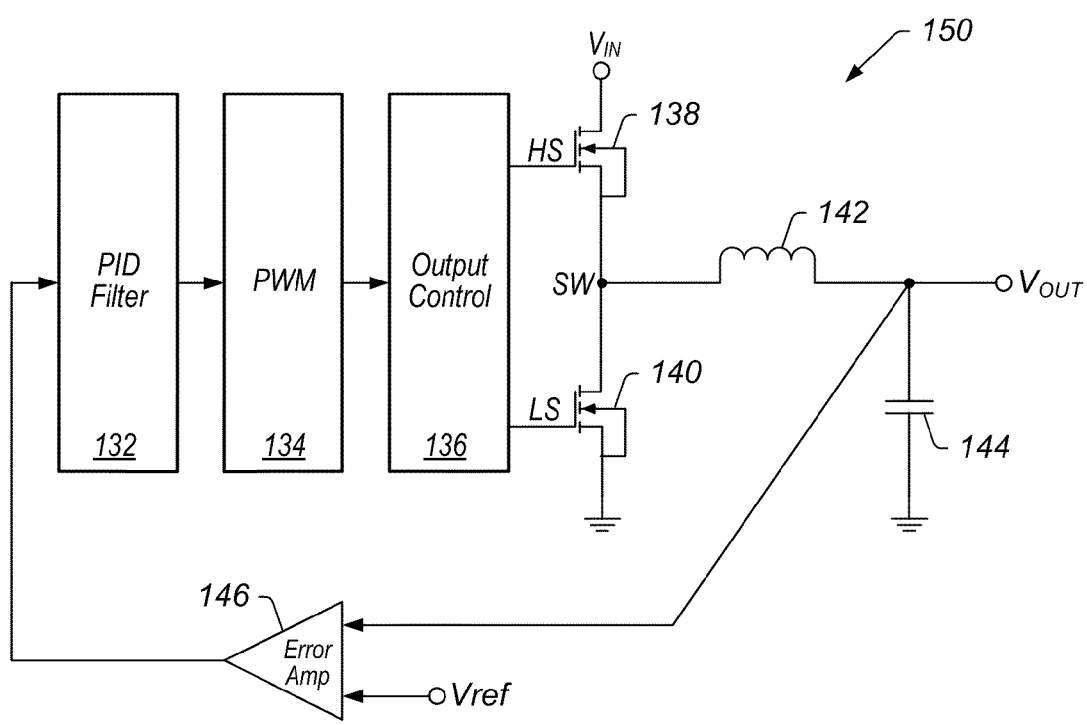
FIG. 6 shows one embodiment of a power regulator commonly referred to as a "Buck Regulator"

Switching power regulators often use two or more power transistors to convert energy at one voltage to another voltage. One common example of such a power regulator 150, commonly called a "Buck Regulator" is shown in FIG. 6. Buck Regulator 150 typically switches a pair of power transistors, high-side (HS) FET 138 and low-side (LS) FET 140 in order to produce a square-wave at their common node SW. The produced square-wave can be smoothed out using an LC circuit comprising inductor 142 and capacitor 144 to produce the desired voltage, $V_{out}$. A control loop, comprised of an Error Amplifier 146, a Proportional-Integral-Differential (PID) Filter 132, a Pulse-Width-Modulator (PWM) 134, and an Output Control circuit 136, may be configured to control the duty-cycle of the output square-wave, and hence the resulting value of $V_{out}$. As used herein, HS FET 138 is referred to as the control FET, LS FET 140 is referred to as the sync FET, and the signal from Output Control circuit 136 to HS FET 138 is referred to as the (output) control signal of the POL regulator. In a typical POL converter, the duty cycle (D) of the control signal may be defined as the desired output voltage ($V_{OUT}$) divided by the input voltage ($V_{IN}$). Therefore, the control FET may be turned on for the duration defined by the duty cycle, and conversely the sync FET may be on for the duration of the switch cycle defined as 1−D, where D is the duty cycle of the control FET (as previously indicated).

In one set of embodiments POL regulators may be configured as multiphase point of load, or POL, DC/DC converters, operating in a multiphase configuration in order to boost the total current available to a system. One of the issues that may arise in such a configuration is current balancing, which may need to be performed to maintain stability while supplying high current. Most present day solutions do not offer means to balance current through use of a low bandwidth algorithm, and also typically fail to provide methods to balance load line currents by adjusting the target voltage in a digitally controlled feedback loop. In one set of embodiments, current balancing may be performed by utilizing an active low bandwidth current sharing algorithm that uses matched artificial line resistance (droop resistance) while maintaining multi-loop stability during both steady-state and dynamic transient states. Digital communication between the devices may facilitate the current sharing algorithm, where the digital bus may be a single wire bus, a parallel bus or a clock and data bus.

Active Droop Current Sharing

Figure 7:
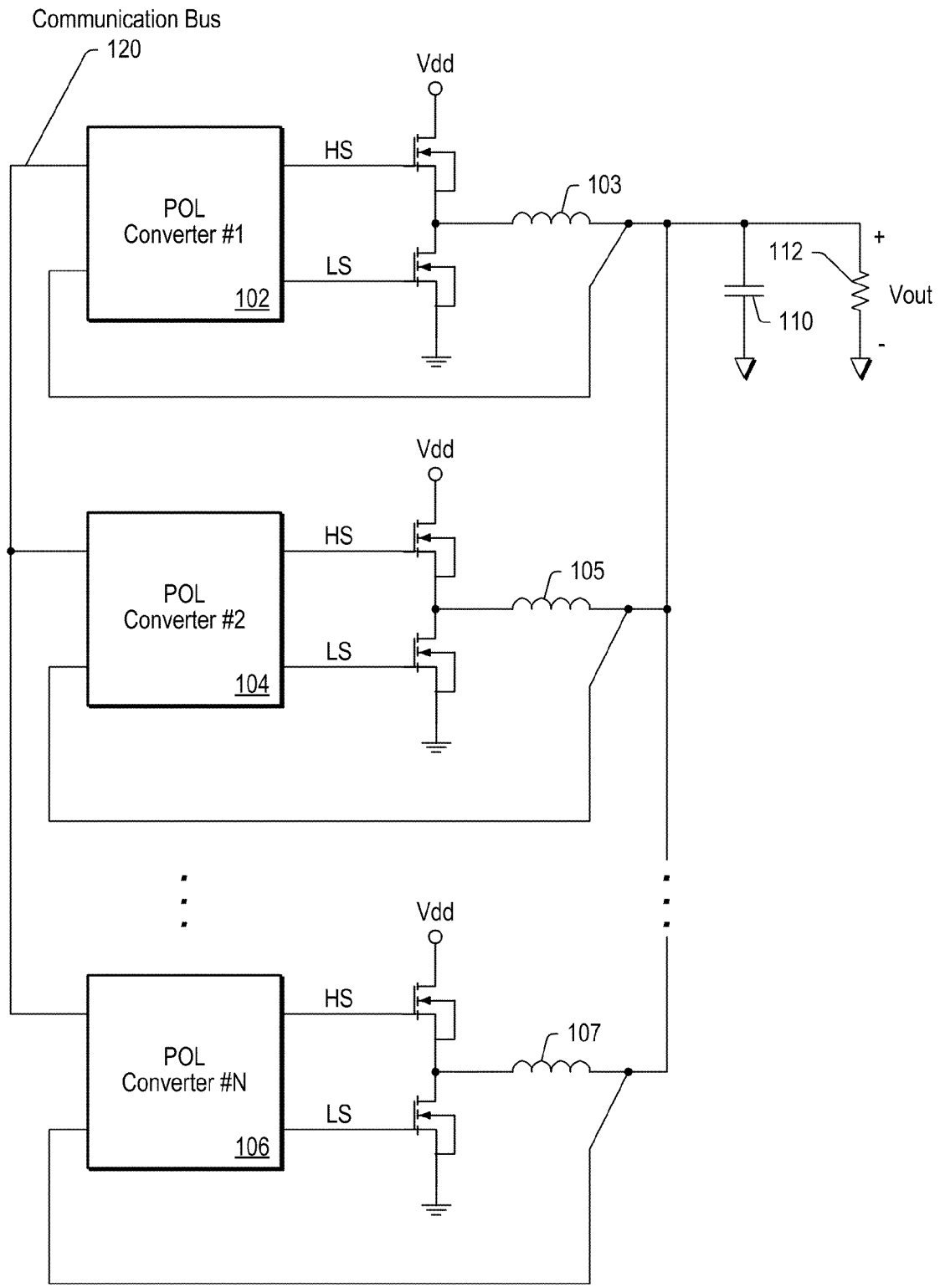
FIG. 7 shows one embodiment of a current sharing configuration according to one embodiment of the DPA system of FIG. 5.

Distributed power through shared point of load supplies has a number of compelling advantages over a single point of load supply, or POL regulator. Distributed or current sharing may be used to accommodate the ever increasing current demands associated with low voltage applications through better efficiency over a wide range of output currents, reliability through redundancy, and distributed heat dissipation. One example of a current sharing configuration according to one embodiment of the DPA system of FIG. 5 is shown in FIG. 7. POL converters 102, 104, and 106 (representative of a first, second, and Nth POL converter) may be coupled to a digital communication bus 120, with their respective regulated voltage outputs shared through respective inductors 103, 105, and 107, and capacitor 110, to provide a single voltage at a load represented by resistance 112. It should be noted that while in FIG. 7 the output stages (the HS FET and LS FET transistor pairs) are shown outside the respective POL converters, in FIG. 6 the output stage is indicated as being a part of the POL regulator, to best highlight certain specified features of the different embodiments. It should also be noted that while the output stage is a functional part of the POL converter, when the POL converter is configured on an integrated circuit (IC) for example, the control circuit and the output stage may or may not be configured on the same IC. Those skilled in the art will appreciate that various illustrations of the POL regulators disclosed herein are meant to embody all possible implementations in accordance with the current sharing principles set forth herein.

In one set of embodiments, a low bandwidth, multi-order digital control loop may be configured to balance the inequalities between device outputs by aligning the load lines of slave devices (POL regulators operating as slave devices on the digital communications bus) to a master device (a POL regulator operating as a master device on the digital communications bus). However, a first-order digital control loop may be sufficient. A self-determined or dedicated master POL regulator (for example POL regulator 104) may digitize its sensed output current, and transmit information indicative of the value of this current over the digital communication bus 120 to all slave POL regulators (e.g. POL regulators 102 and 106) of the group in a traditional master-slave configuration. All slave devices may adjust the duty cycle of their respective control FETs to effectively increase or decrease their output voltage up or down, based on the difference between the value of master device's output current and the value of the respective slave device's output current. One embodiment for the trimming of the output voltages may be accomplished by adjusting the target voltage (Vref, in regulator 150) in the front-end error amplifier (amplifier 146, in regulator 150). Other embodiments for the trimming of the output voltages may be accomplished by scaling the duty cycle either by correcting the taps in the control filter (132, in regulator 150), or by adjusting the control number to the duty cycle control block (134, in regulator 150). The master device may actively transmit the information indicating the value of its current over a communication bus, such as, I2C, SMBus or some other communication bus (120, in the configuration of FIG. 7), while the slave devices may use that information to trim their programmed reference voltage to balance the current loading of each device in the system. The master device may continue to transmit the information until a fault occurs, its phase is dropped or its communication interface fails, at which point the other slave devices in the group may arbitrate the new master. The member currents (i.e. the individual currents of the POL regulators in the current sharing group) may thereby be balanced to, for example, within 5% of the averaged member load current with a 16 Hz update bandwidth.

As exemplified in FIG. 6, POL regulators may use feedback control methods to produce a regulated output voltage based on a fraction, or duty cycle arithmetic, of an input voltage. In order to meet the system needs of higher load current, a new method of current sharing may be implemented. Current sharing between POL regulators may be achieved by adjusting slave devices' load lines with respect to a dedicated master's current. A load line algorithm may implement adding artificial line resistance, referred to herein as "droop resistance", in the output voltage path of the POL regulator to control the slope of the load line curve (i.e. output voltage versus load current), to calibrate for the physical parasitic mismatches between devices and their power trains, which may be due to process and temperature variances and printed circuit board (PCB) layout differences.

Figure 8:
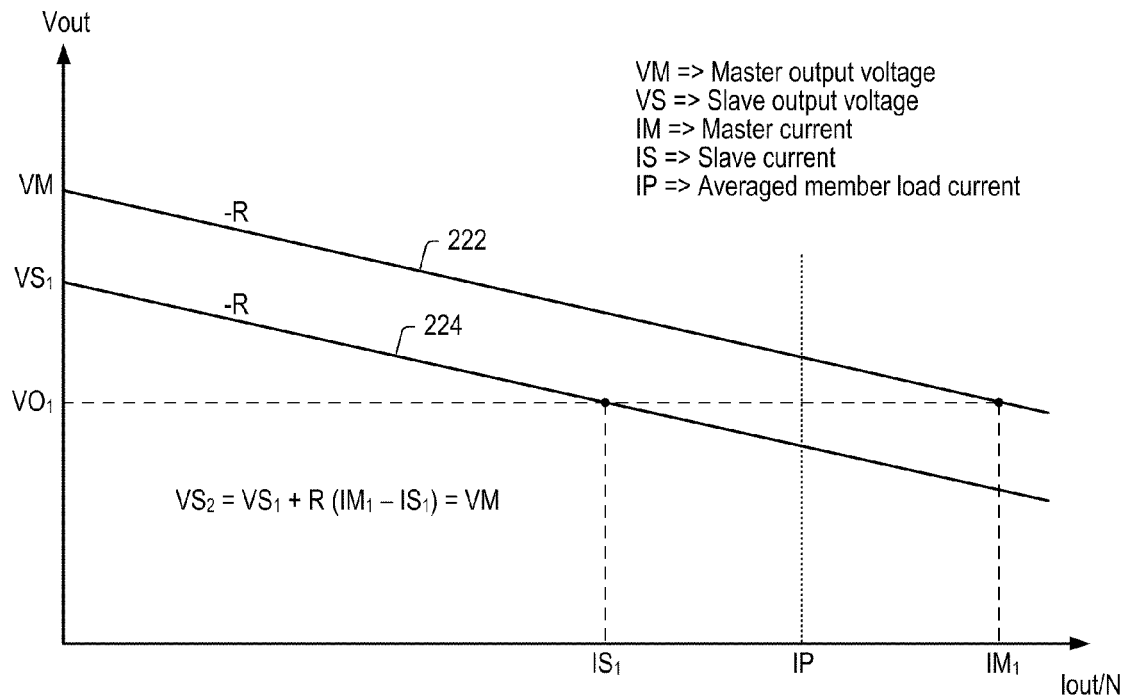
FIG. 8 shows a voltage vs. current diagram illustrating an ideal case where respective load lines of two POL devices have identical slopes.

FIG. 8 shows an ideal case where respective load lines (222 and 224) of two POL devices have identical slopes. In one set of embodiments, a current sharing operation may be configured to increase the slave reference voltage (e.g., the reference voltage of POL device 102, which may be operating as a slave POL converter) towards the master reference voltage (e.g. the reference voltage of POL device 104, which may be operating as the master POL converter) by trimming the slaves' output voltage with respect to the master's current. This may effectively reduce/close the gap between the respective inductor currents of the involved POL devices. If the master's current is higher than the slaves' detected current loading, then the slave may increase (trim up) its output voltage, which may cause a drop in the master's inductor current while the slave's inductor current increases. The opposite may also be true. That is, if the slave's reference voltage intercept is above the master's reference voltage intercept, the slave's reference voltage intercept may be decreased to close the gap in inductor currents and cause the output voltage to drop.

Figure 9:
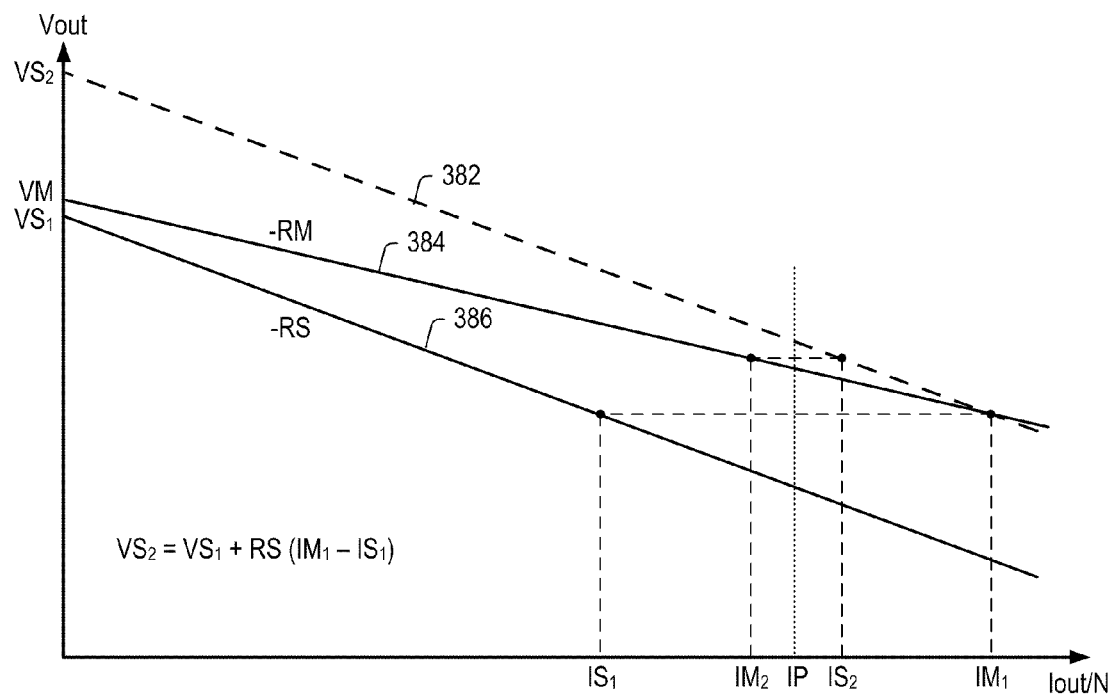
FIG. 9 shows a voltage vs. current diagram illustrating a case where the slave device's droop resistance is higher than the droop resistance value of the master device.
Figure 10:
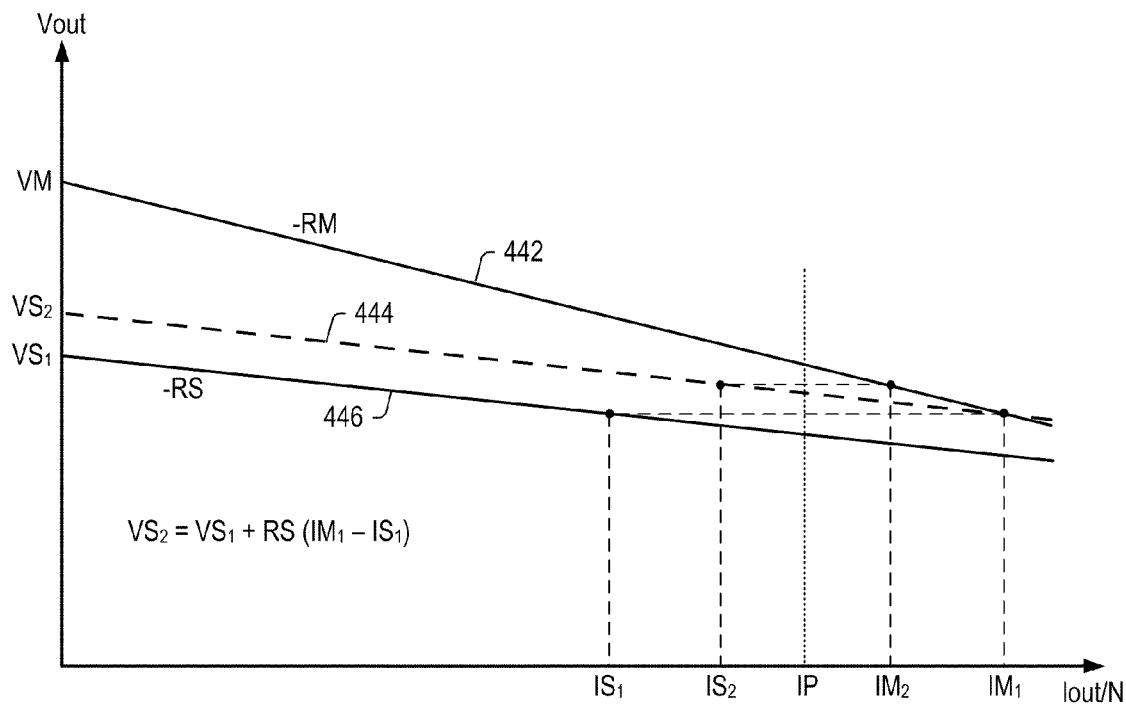
FIG. 10 shows a voltage vs. current diagram illustrating a case where the slave device's droop resistance is lower than the droop resistance value of the master device.
Figure 11:
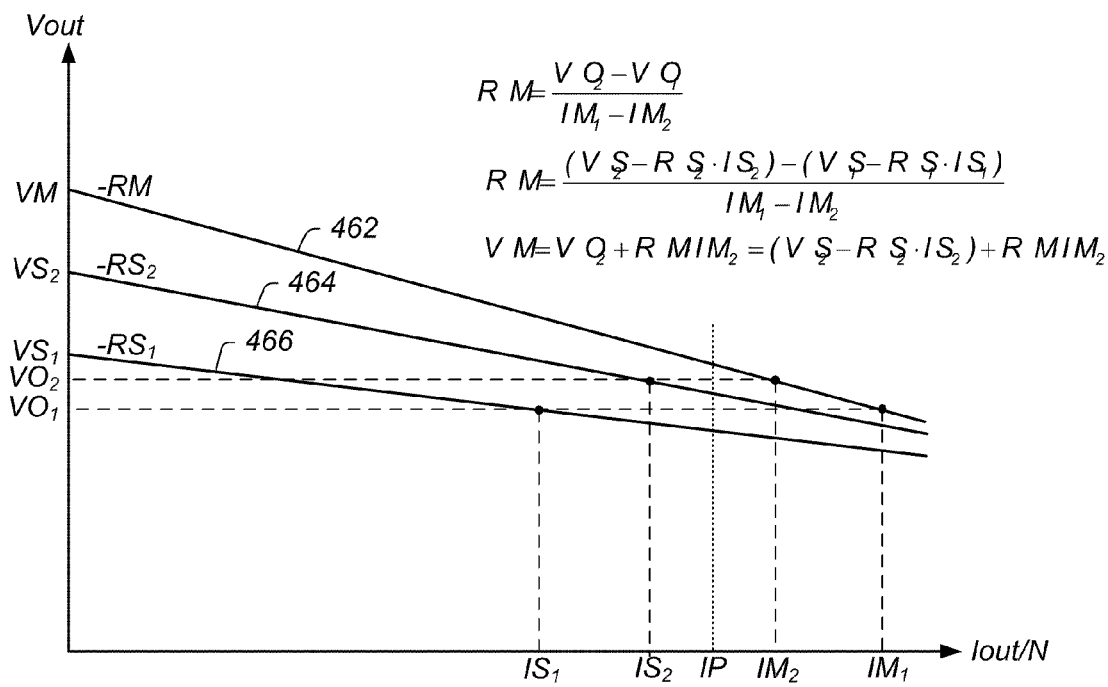
FIG. 11 shows a voltage vs. current diagram illustrating load lines for second order current sharing.
Figure 12:
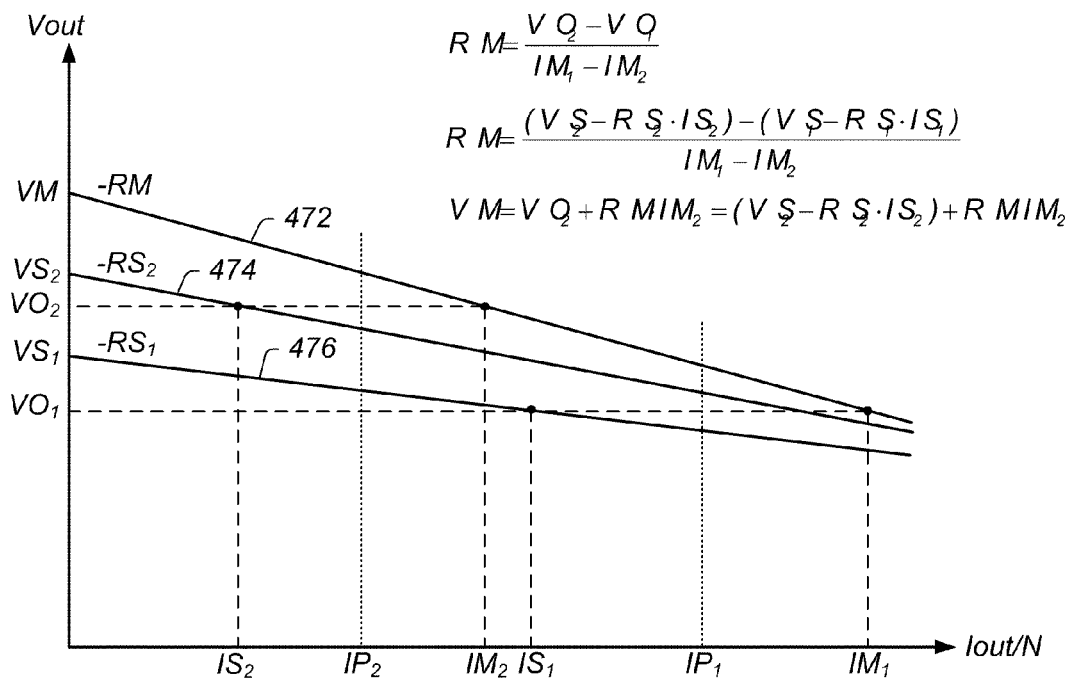
FIG. 12 shows a voltage vs. current diagram illustrating load lines for second order current sharing with load change.

In one set of embodiments, an algorithm may operate to use an integrator to enable the slave devices to actively balance their respective output voltages with respect to the output voltage of the master device, by actively calibrating out the mismatches between devices. The algorithm may not be limited to current sharing by devices having identical droop resistance, and may be configured to adapt the output voltage of each device to the most appropriate operating point based on the device droop resistance, the device load current, and the communicated value of the master's load current. For example, the slave device's droop resistance may be higher than the droop resistance value of the master device, as exemplified in FIG. 9 (load lines 382, 384 and 386), or it may be lower than the droop resistance value of the master device, as exemplified in FIG. 10 (load lines 442, 444, and 446). As previously mentioned, the adjustment of the output voltage may be achieved by scaling the duty cycle of the period of the gate signal to the control FET on the output filter. The scaling of the duty cycle may be performed in a variety of ways (as also previously mentioned), directed overall to reducing or increasing either the error signal in the control loop (e.g. the output of error amplifier 146, as exemplified in FIG. 6), or the result of the control loop (e.g. the control signal provided by output control 136, as exemplified in FIG. 6). The algorithm may be adapted to control current sharing between any number of devices that can physically be included in a current sharing configuration. The current sharing may also be applied to a second order correction where the slave droop resistances are adapted to find the optimal load line slope to match the master's curve. Load lines for examples of second order current sharing are shown in FIGS. 11 and 12. FIG. 11 shows load lines 462, 464, and 466 for second order current sharing, and FIG. 12 shows load lines 472, 474, and 476 for second order current sharing with load change.

Figure 13:
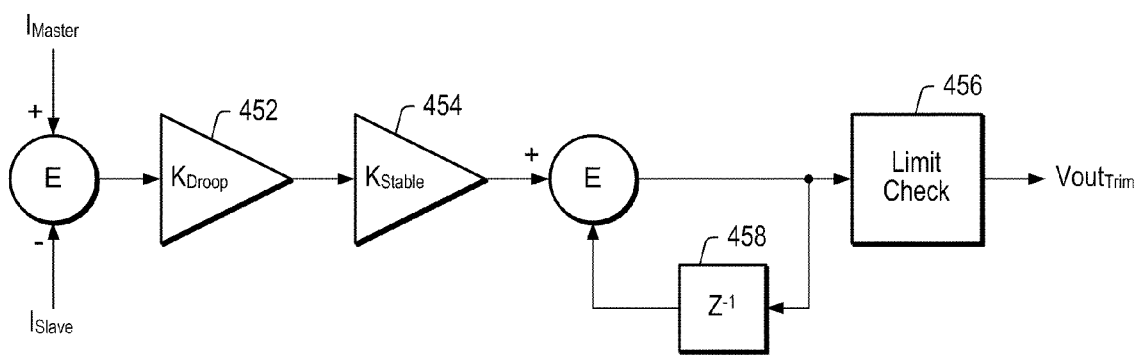
FIG. 13 shows a control diagram that includes a first-order control feedback path for current balancing a slave device according to one embodiment.

In one embodiment, the balancing algorithm may be implemented through signal processing to allow the master to communicate the value of its current over a much lower bandwidth. FIG. 13 shows a first-order control feedback path for current balancing a slave device according to one embodiment. While FIG. 13 only illustrates a first-order control mechanism, second, third, and higher order control loops may also be implemented depending on both the system and the required time to converge. The control feedback path of FIG. 13 may be represented with the following equation:

$$V_{out} = V_{ref} + V_{trim}(n) = V_{ref} + R_{droop} * (I_{Master} - I_{Member}) * K_S + V_{trim}(n-1).$$

In a closed digital system, aliasing may occur if the sampled data signal's highest frequency is not less than the Nyquist rate. However, the sample rate may be undeterminable, as each current sample may not be immediately transferred or received. The uncertainty of the sample rate may reduce the certainty of beat frequencies in the sampling, and may appear as random instability in the output voltage. In one embodiment, the algorithm may also be configured to control the frequency of the oscillator, thereby spreading the uncertainty of the rate of processing between device processors, causing non-correlation. Furthermore, since the devices may have internal device oscillators, the correlation may be further reduced due to device process and temperature variance and manufacturing. Additionally, the traffic on the communication bus may further dither the current sharing sampling rates.

The algorithm may operate to attenuate the error signal (e.g. the output of error amp 146 in FIG. 6) by a specified gain factor $K_{Stable}$ (454 in FIG. 13), for example:

$$K_{Stable} = \frac{0.001}{4},$$

multiplied by a droop resistance (452 in FIG. 13), which may typically be 1.25 mV/A, though it may take on other values. The droop resistance may operate to calibrate any physical board layout mismatches between the master and slave power stages and feedback sense paths. In order to maintain stability and to reduce the integrator (458 in FIG. 13) overshoot, the maximum correction—by which the slave devices may limit their respective output voltage adjustments per current sharing cycle—may be specified, and may be programmable.

Embodiments may be configured assuming an ideal load line slope. However, the load line resistance of the slave may not equal the resistance of the master, as previously discussed (see FIGS. 9 and 10, for example). Various embodiments of the current sharing algorithm may still balance the currents appropriately, according to the determined equation. The algorithm may be more active over time as the output current changes, since the two load lines intersect at the point where the inductor currents are equal. This may also be expected as the devices balance over process, voltage and temperature.

A specific current balancing bandwidth (of 16 Hz, for example) may be verified as being sufficient enough to maintain stability, and the communication rate may be specified to ensure that the difference in loads between current sharing member devices is less than a specified, acceptable percentage (e.g. 5%) of the total load.

Figure 14:
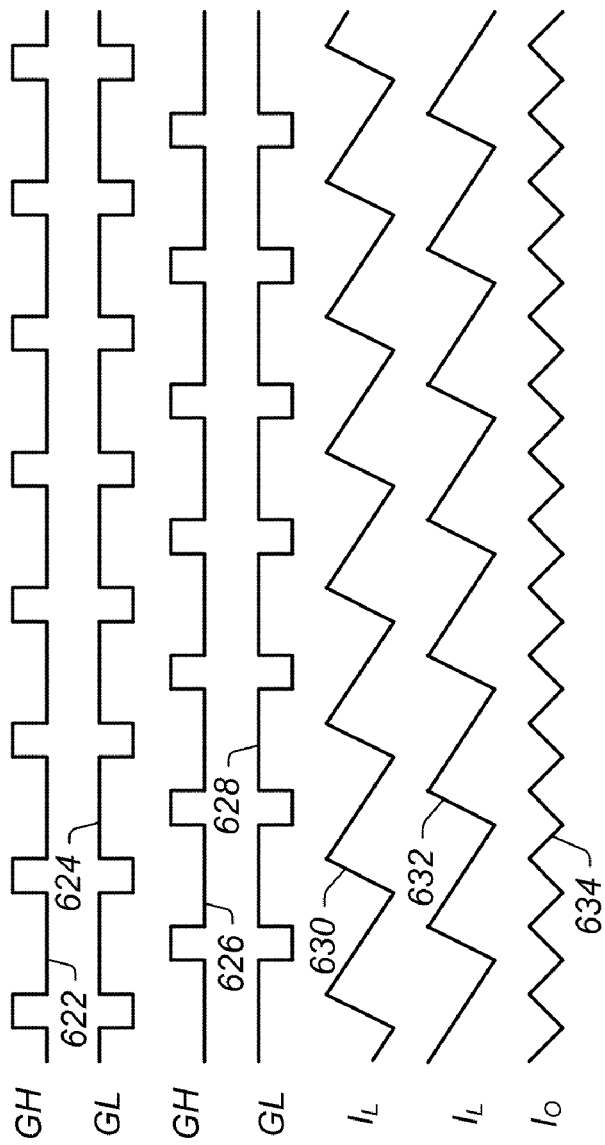
FIG. 14 shows a signal diagram illustrating gate signals and output currents for two regulators in a current sharing configuration during normal regulation.

The current sharing configuration and programming may be accomplished through a serial communication or through pin strap settings and resistors (in pin strap settings, pins may be coupled to a voltage level corresponding to a logic '1' or to a voltage level corresponding to a logic level '0' to effectively program the device). The sharing groups may support an infinite number of device members, but the actual number of member devices (member POL regulators) in the group may be specified to a set number, e.g. to sixteen, which may be phase spread throughout the unit circle or 360°/16=22.5° degree separation between the switching of members of the same group. In certain embodiments, the members of a current sharing group may be manually interleaved or autonomously distributed about the unit phase circle to distribute the stress of the switching effects on the input voltage. This is illustrated in FIG. 14, showing current sharing during normal regulation, where GH refers to the control signal to the control FET, and GL represents the complement of the control signal to the sync FET. Square waves 622 and 624 represent the respective gate signals of a first POL device, while square waves 626 and 628 represent the respective gate signals of a second POL device. The output current 630 of the first POL device and the output current 632 of the second POL device are combined in the current sharing configuration to obtain load current 634.

Furthermore, as the output current increases, the amount of droop—by which the output voltage may deviate from the desired set-point level—may be a function of droop resistance multiplied by the output load current. Therefore, as the output load current increases, the regulated voltage may drop. However, the master device may instruct all slave devices in the current sharing group to simultaneously trim their respective output voltages as a function of the detected output current. Since the master device may have information pertaining to the number of active devices in a current sharing group, its output load current, and the droop resistance, it [the master device] may synchronize all slave devices over a communication bus to margin their respective output voltage set-points to minimize the effect of load current and droop resistance on the regulated voltage level.

In addition, control loops may be used in each member device to respond to a transient event simultaneously as a group, even if the member's voltage control loops are phase interleaved, to allow enhanced transient responses. While previous passive droop sharing approaches to current sharing have been simple and cheap, those previous approaches have usually required some form of manual calibration (e.g. trim of the devices' output voltages). In contrast, various embodiments of active droop current sharing presented herein may be realized through fully digital communication techniques using a single bus and single corresponding bus protocol, thereby increasing reliability over the long term.

Adding and Dropping Phases in a Current Sharing Group

When operating multiple POL devices in a multiphase configuration to boost the total current available to a system, it may become necessary to properly add and drop phases to a current sharing group. Phase addition or phase removal may or may not take place because of certain system requirements, although commonly, the number of active phases (active POL regulators) may depend on either efficiency of the current sharing group at certain output load levels, or fault conditions. To avoid sacrificing efficiency with multi-phase supply systems, it may be beneficial to add and drop phases (add or remove POL regulators from the current sharing group) without causing perturbations on the output voltage. In most present day implementations, the on-time of the respective control FETs of all members of a current sharing group is adjusted to add or drop phases.

In one set of embodiments, gate signals of the device to be added to or dropped from a current sharing group may be scaled without communication or knowledge of the other devices. As previously mentioned (with respect to FIG. 6), the control FET may be on while for the duration defined by the duty cycle, and conversely, the sync FET may be on for the duration of the switch cycle defined as D'=1−D, where D is the duty cycle of the control FET. While typically D' is merely the inverse of the gate-high signal, in adding and dropping phases, D' may be independently controlled. Accordingly, the signal to the sync FET is referenced herein as the gate-low signal. In one set of embodiments, hardware circuits/elements may be configured to control the on time of the control FET signal and the on time of the sync FET signal. These hardware circuits/elements may be synchronized to scale both gate signals (the control signal and the signal to the sync FET) simultaneously or separately. In one set of embodiments, phases of a current sharing group may be added and dropped without causing a transient on the output voltage. A phase may be added or dropped without disturbing the output voltage upon detecting a load condition (e.g. light load). The current sharing group may autonomously detect the load condition (e.g. light loads), or a host processor may provide a control signal or communication indicative of the load condition. However, how the device in the current sharing group determines why the device needs to be added or dropped may itself not affect the manner in which a phase may be added or dropped.

In one set of embodiments, a circuit may be configured to operate according to at least two methods for seamlessly adding and dropping phases in a current sharing group of POL regulators without perturbing the output voltage of any of the devices (POL regulators) in the current sharing group. Transients on the output voltage are typically caused when one member of a current sharing group completely removes its contribution to the output voltage by instantaneously eliminating the gate-high signal and the gate-low signal. Instantaneously removing a member device's gate-high signal may therefore cause a transient on the output voltage similar to a loading case (load increase; i.e. the load on the output has increased), where the output voltage will swing higher. This may occur because the charge in the inductor (refer to FIGS. 6 and 7, for example—inductors 142 and 103, 105, 107, respectively) must be dissipated. Conversely, if a member device instantaneously eliminates its gate-low signal, its inductor current will seek a different return path, and the transient may appear as an unloading case (load reduction; i.e. the load on the output has decreased). The transients may be self-induced, or the system may take a few switch cycles to recover.

Current sharing groups may interleave the phasing of the active devices, which may effectively increase the switching frequency by the number of active devices while reducing the output ripple. As previously mentioned, FIG. 14 shows signal diagrams for current sharing during normal regulation, in which the phases of a dual phase current sharing group's (two POL regulators operating together) current signature are out-of-phase by 180 degrees. In one set of embodiments, a member device of a current sharing group may sequentially remove both its GL (gate-low) and its GH (gate-high) pulses over a programmable number of switch cycles. This may allow the system to react favorably to the transient over an averaged number of cycles, independently of how the device determines whether its phase contribution to the current sharing group should be added or dropped. For example, in some cases, the POL device may include a control unit (e.g. microprocessor) executing programming instructions (e.g. firmware), and the control unit may receive a communication pulse or packet from an external host, or the POL device itself may determine that the phase may be added or dropped. In other cases, the POL device may not contain such a control unit, and the determination to add or drop a phase may be implemented through other means, for example as a discrete finite state machine (FSM).

In one set of embodiments, a control unit (e.g. microprocessor) executing instructions (e.g. firmware) within the POL device, or a discrete FSM within the POL device may be instructed to add or drop a phase by sequentially manipulating the pulse width of the gate signals (i.e. the GL and GH signals). In order to add or drop a phase, the device may deliberately and systematically turn on or shut off its gate drive signals to avoid introducing a transient into the system. For example, dropping a phase may be accomplished by modulating the synchronous gate drive to a zero width duty cycle over a programmable number of switch cycles, and adding a phase may be accomplished by modulating the synchronous gate drive to a duty cycle having a predetermined or expected width (as dynamically determined by the system, for example) over a programmable number of switch cycles.

Figure 15:
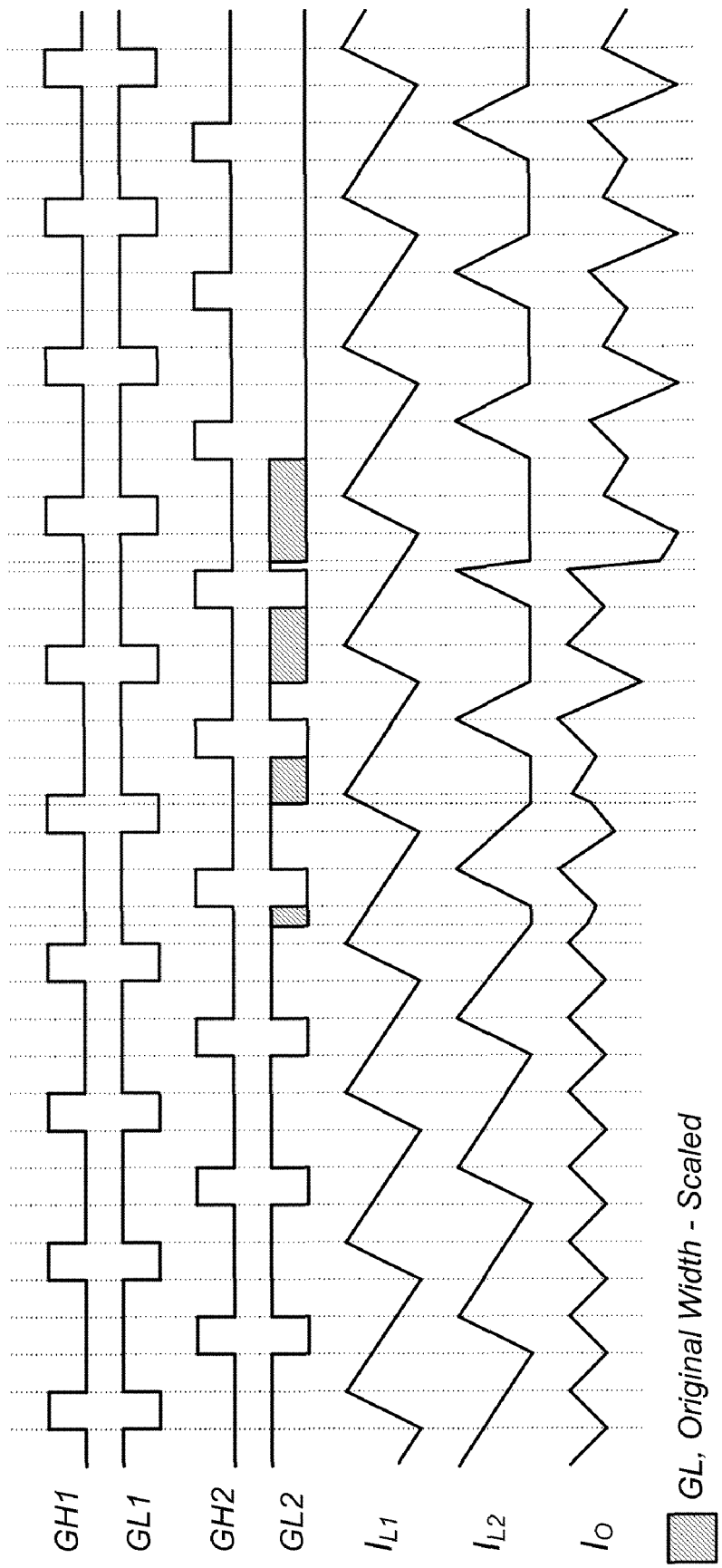
FIG. 15 shows a signal diagram illustrating gate signals and output currents for two regulators in a current sharing configuration, with the second regulator slowly reducing the width of its GL pulse (GL2) over a programmed number of switch cycles until it is eliminated and the regulator is switching asynchronously.
Figure 16:
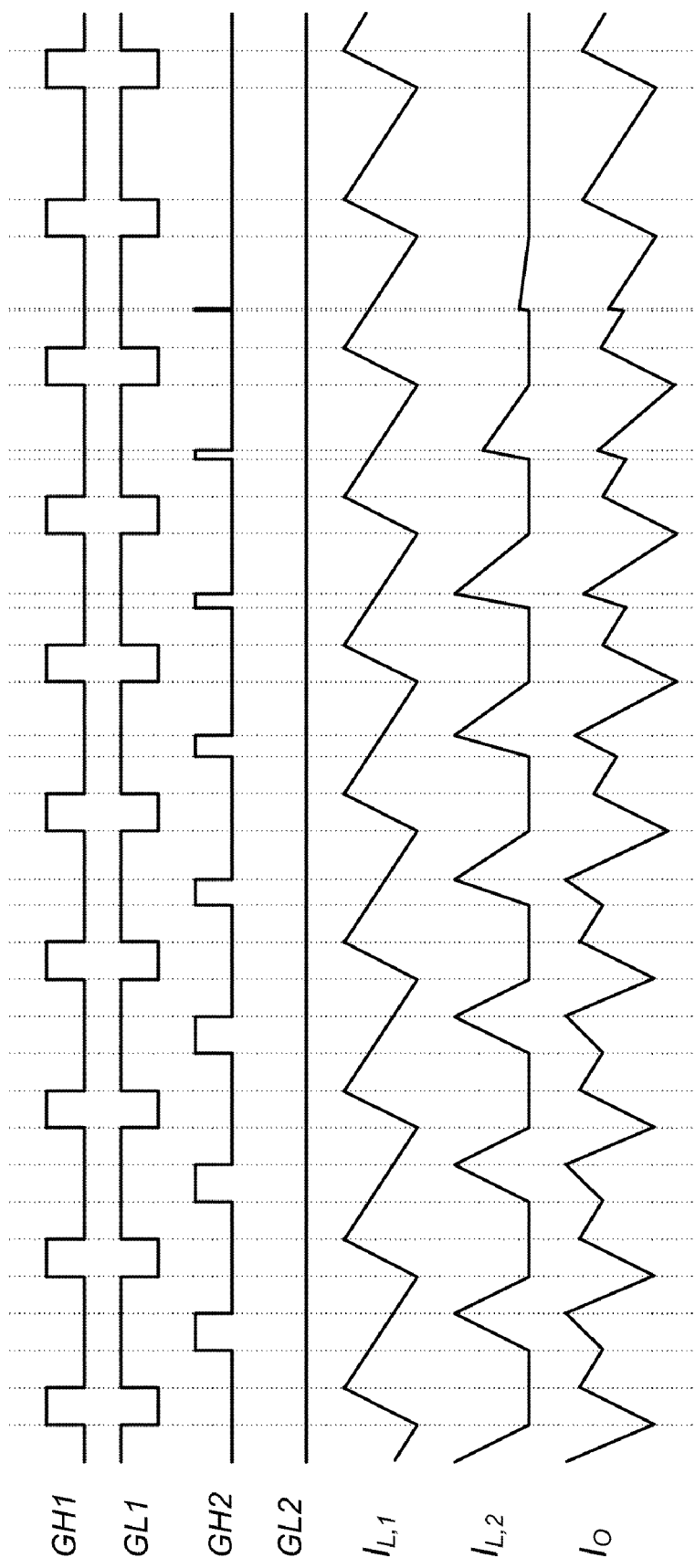
FIG. 16 shows a signal diagram illustrating the gate signals and output currents from FIG. 15, with the second regulator attenuating its GH signal (GH2) by reducing the width of the GH pulse over a programmed number of switch cycles until it is eliminated.

When dropping a phase, the POL device may or may not condition the error path to eliminate any spurious duty cycle perturbations. The device may attenuate the error signal feeding into the integrator of the converter (e.g. PID filter 132 in FIG. 6), and the may also freeze the present state of the integrator. The POL device may slowly reduce the width of its GL pulse over a programmed number of switch cycles until it is eliminated and the device is switching asynchronously, as shown in FIG. 15, where the GL signal of one of the POL devices (in this case POL device 2) is gradually eliminated. As GL2 is eventually eliminated, the output current $I_{L2}$ of the second POL device changes, also affecting the overall current $I_O$. The same POL device may then attenuate its GH signal by reducing the width of the GH pulse over a programmed number of switch cycles until it is eliminated, as shown in FIG. 16. As GH2 is eventually eliminated, the output current $I_{L2}$ of the second POL device is eventually reduced to zero, resulting in the overall current $I_O$ tracking the output current $I_{L1}$ of the first POL device.

When adding a phase, the device may use the last state of the integrator as the starting operating duty cycle. The device may sample the output voltage and pre-bias the set-point voltage with the presently sensed output voltage in order to achieve zero error going into the integrator. The integrator may be initialized according to the sensed output voltage to obtain an initial duty cycle value of Vout/Vin. The device may then release the GH pulse, for example by steadily climbing to the maximum allowed pulse, from zero to full-scale over a programmable number of switch cycles. The device may then reverse the integrator in the GL modulation circuit and effectively release the GL pulse over a programmable number of switch cycles, then release the integrator to allow the device to regulate output voltage.

Figure 17:
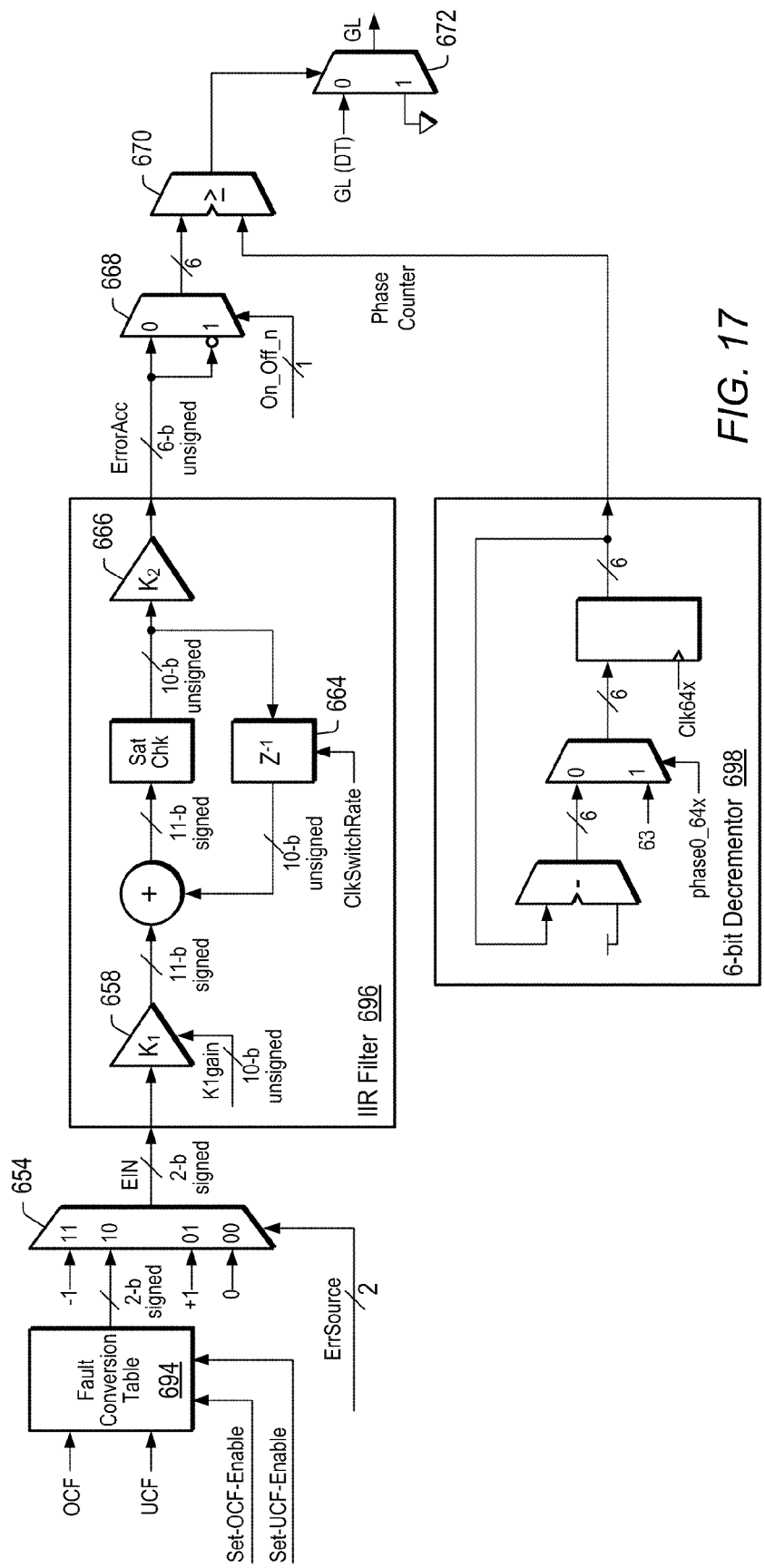
FIG. 17 shows a control diagram for one embodiment of a modulation circuit for reducing or releasing the width of the synchronous FET gate pulse.

A control diagram of one embodiment of a possible circuit for reducing or releasing the width of the synchronous FET gate pulse or GL is shown in FIG. 17. The circuit may be based on a bounded first order infinite impulse response (IIR) filter 696. The input error source may be programmable in a fault conversion table 694 as an under-current fault, shown as UCF, in FIG. 17, an over-current fault, shown as OCF, in FIG.

17, or control from a controller (e.g. microprocessor), shown as Set-OCF-Enable and Set-UCF-Enable, in FIG. 17. In one set of embodiments, the error input (EIN) into IIR filter 696 may be defined as signed two-bit value, and may be selected via multiplexer 654, according to an error source select signal. Slewing of the integrator may be controlled by a first gain factor, K1 658. The stability of the system may depend on the value of K1, which may be defined as an eight-bit integer in certain embodiments. The K1 gain factor may be used to determine step-size, the integrator slew, and the frequency of modulation adjustments. Since the input may range from −1 to 1 (in case of a signed two-bit value—when the error value is defined to be of a different bit length, the range may be different accordingly), the need for a multiplier may be eliminated as the filter integrator may either increment or decrement based on the error input in K1-valued steps. The integrator (664) may further be configured to be unsigned and unipolar since GL may either be on or off (as selected through multiplexer 668), and the filter may not be expecting transients.

The gain of the GL integrator ($K_{GL}$) may be defined by equation 1, where X is the running sum in the integrator and N is total number of switch cycles necessary to saturate the integrator or turn off GL:

$$\sum_{i=0}^{N} K_{GL} * \frac{X_i}{2^{10}} = 1. \quad (1)$$

In order to solve the summation, equation 1 may be converted into integral form:

$$\int_{0}^{N} K_{GL} * \frac{X}{2^{10}} * dx = 1. \quad (2)$$

Solving the integral, $K_{GL}$ may be expressed in terms of the required time to remove GL (removal of GL may be communicated as a command over the communications bus, e.g. bus 120 in FIG. 7), and the switch rate:

$$\frac{K_{GL}}{2^{10}} * \left[\frac{X^2}{2}\Big|_0^N\right] = \frac{K_{GL}}{2^{10}} * \frac{N^2}{2} = 1, \quad (3)$$

from which:

$$K_{GL} = \frac{2048}{N^2} = \frac{2048}{\left(\frac{T_{GL}}{T_{SW}}\right)^2} \quad (4)$$

Figure 18:
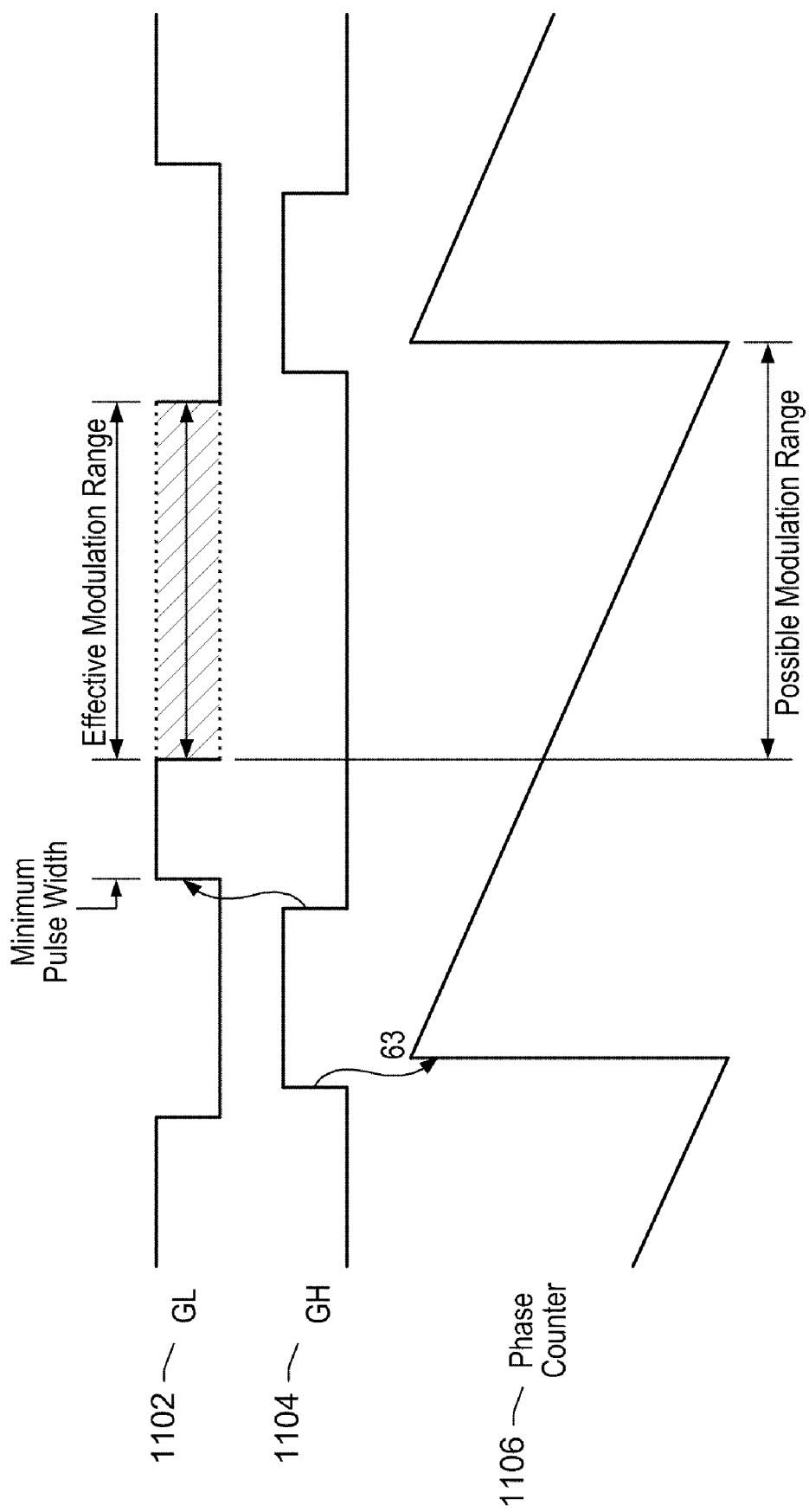
FIG. 18 shows a signal diagram illustrating the gate signals and output current for a single regulator, to illustrate how the modulation circuit may operate to attenuate the gate-low pulse with the minimum pulse width programmed as zero or non-zero.

As illustrated in FIG. 18, the GL modulation circuit may operate to attenuate the gate-low pulse (1102), (shown along with the corresponding GH pulse/signal 1104) where the minimum pulse width may be programmed as zero or non-zero. FIG. 18 also provides one possible waveform of Phase Counter signal (1106), which may be generated by the decrementing circuit 698 (in FIG. 17). The possible modulation range is shown in the shaded area.

Figure 19:
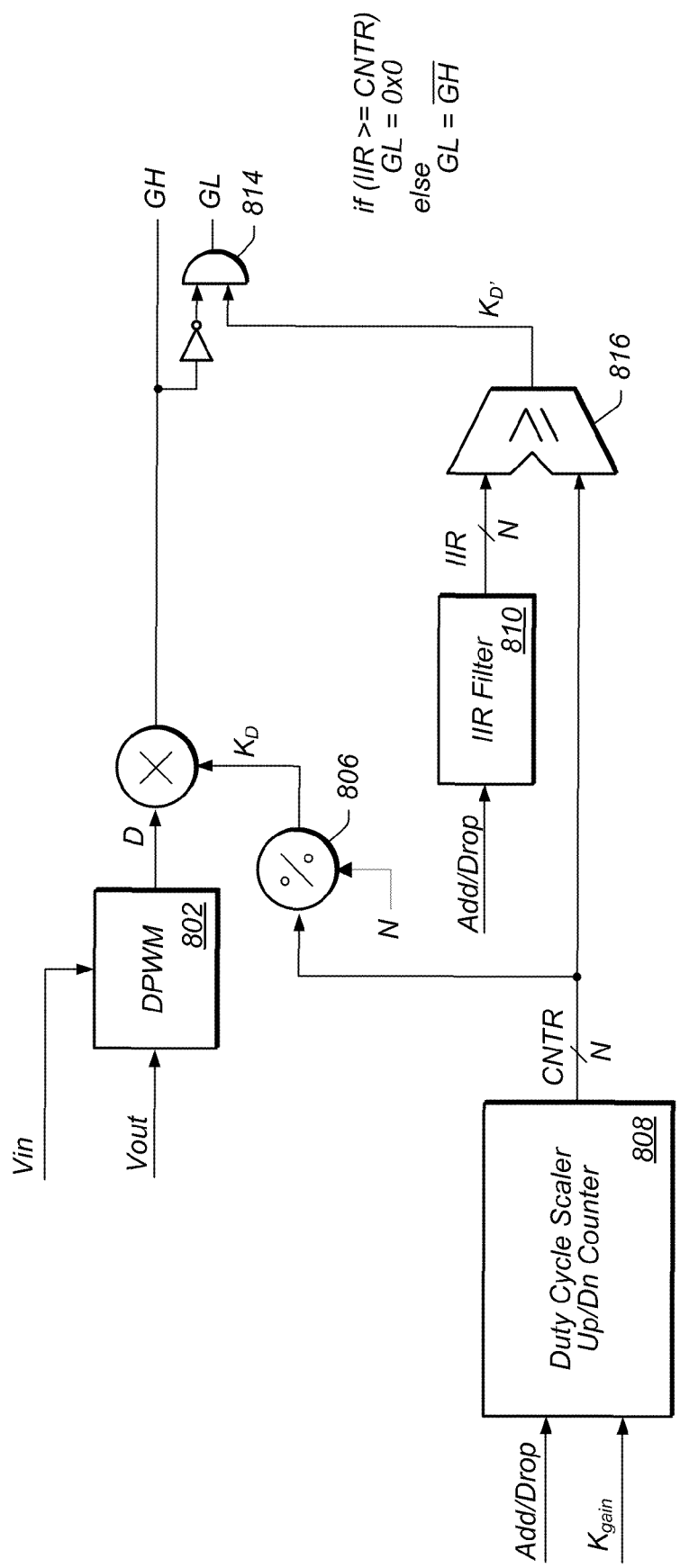
FIG. 19 shows one embodiment of a circuit for performing shared control between the gate-drive signal paths.

In another set of embodiments, a microprocessor running firmware or a discrete state machine may be instructed to add or drop a phase by simultaneously manipulating the pulse width of the two gate signals (GH and GL). In order to add or drop a phase, the device may effectively turn on or shut off its gate drive signals while avoiding introducing a transient into the system. This functionality may be implemented through a circuit which strobes an up/down counter and simultaneously scales the gate drive signals to a typical converter output (e.g. the output stages of the converter embodiments shown in FIGS. 6 and 7). FIG. 19 shows one embodiment of a circuit for performing shared control between the gate-drive signal paths. When dropping a phase, the device may drive the error signal to zero, which may effectively freeze the state of the integrator (DPWM 802) and the device may store the state of the integrator. When adding a phase, the device may use the last state of the integrator as the starting operating duty cycle. Alternately, the device may sample the output voltage, and it may pre-bias the set-point voltage with the present sensed output voltage in order to achieve zero error into the integrator. The integrator may be initialized according to the sensed voltage to obtain an initial duty cycle value of Vout/Vin. The device may then release the GH and GL pulses by allowing a counter (808) to count upward. The counter value may be used to logically release the duty cycle pulse over a programmable number of switch cycles. The device may then release the integrator to allow the device to regulate output voltage.

Scaling counter 808 may count up/down to/from N, and the present count as a fraction of N (806) may produce a scaling factor $K_D$, which may be used to modify the effective duty cycle of the GH signal. Both the scaling counter 808 and IIR filter 810 may receive a control signal (Add/Drop) indicating whether to add or drop a phase. The output of IIR filter 810 may be compared (using comparator 816) to the present count value from counter 808, providing a scaling factor $K_D$, which may be combined with the modified GH signal in AND gate 814 to produce the modified GL signal (pulse). As indicated, when the output of IIR filter is greater than or equal to the counter value, GL may be held at zero (0×0), otherwise it will be the inverse of GH for the duration corresponding to scaling factor $K_D$.

Figure 20:
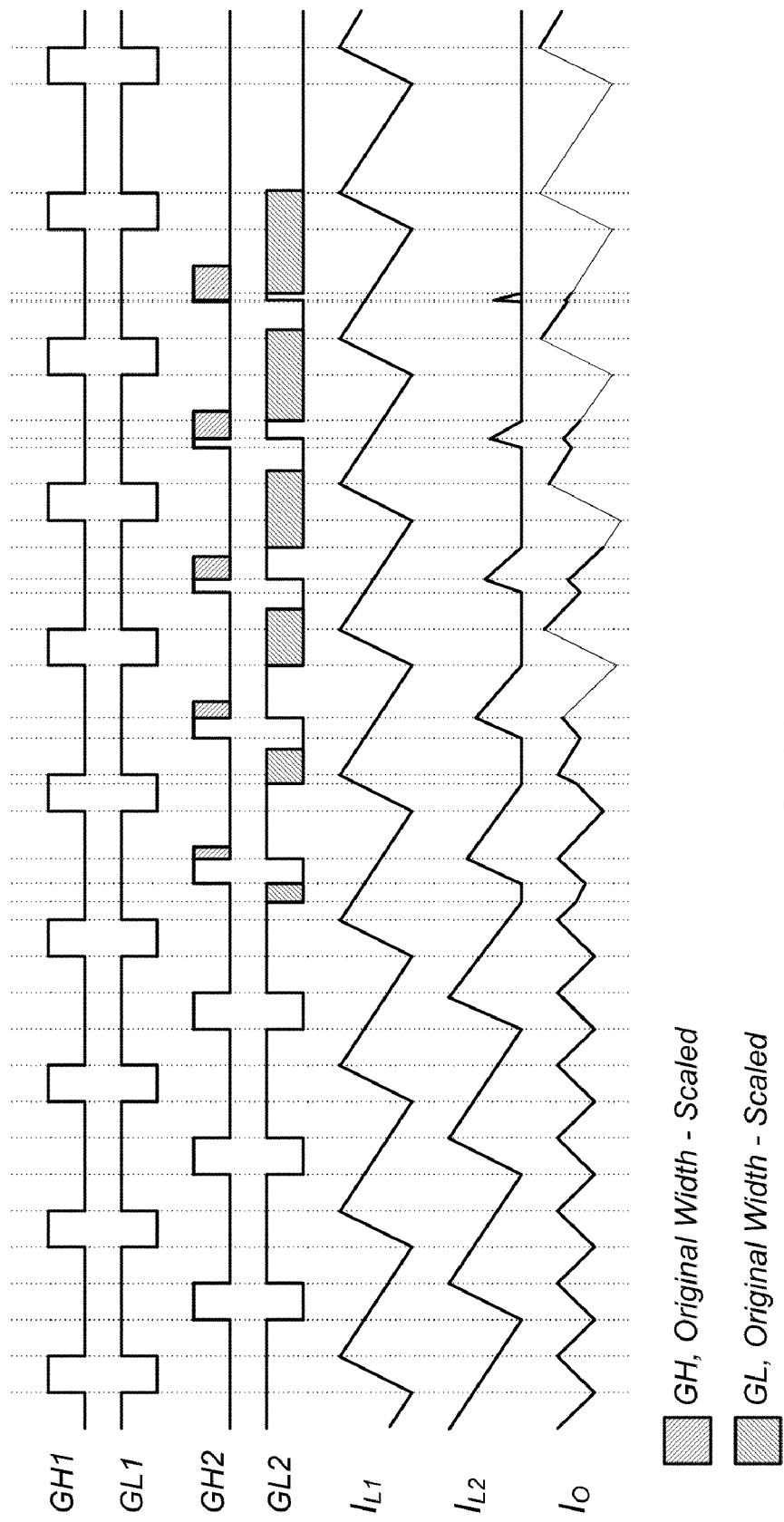
FIG. 20 shows a signal diagram illustrating gate signals and output currents for two regulators in a current sharing configuration during the process of modulating the synchronous gate drive to a zero width duty cycle over a programmable number of switch cycles.
Figure 21:
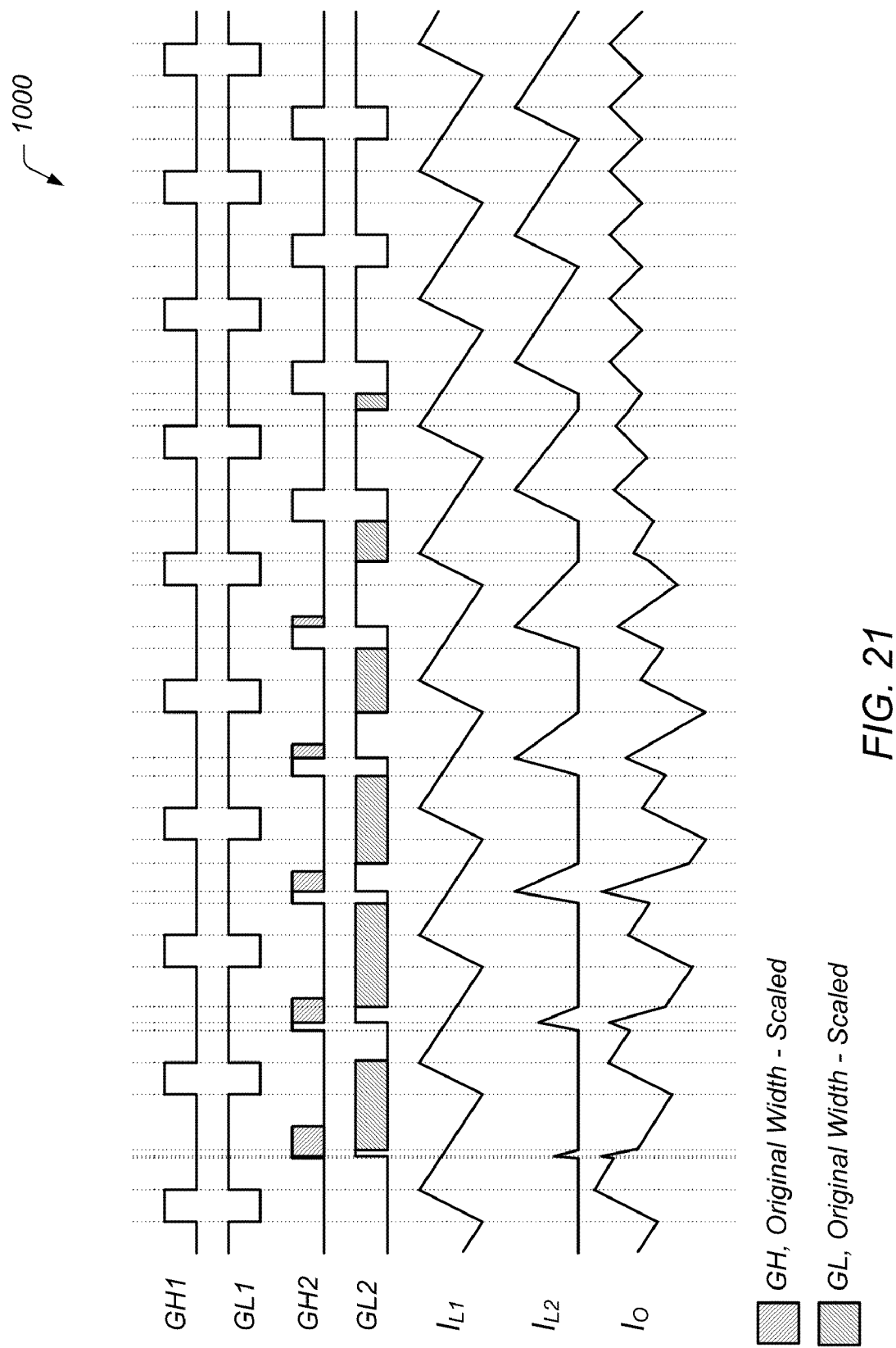
FIG. 21 shows a signal diagram illustrating gate signals and output currents for two regulators in a current sharing configuration during the process of modulating the synchronous gate drive to full (D) width duty cycle over a programmable number of switch cycles.

FIG. 20 shows a diagram illustrating the process of modulating the synchronous gate drive to a zero width duty cycle over a programmable number of switch cycles. As shown in FIG. 20, both GH and GL may be simultaneously modulated to eventually reach a zero value, that is, with no pulses being delivered to the output stage of the affected POL regulator (in this case regulator 2). The shaded areas represent the scaled original width of the respective signal. Similarly, FIG. 21 shows a diagram illustrating the process of modulating the synchronous gate drive to full (D) width duty cycle over a programmable number of switch cycles. As shown in FIG. 21, both GH and GL may be simultaneously modulated to eventually reach a zero value, that is, with no pulses being delivered to the output stage of the affected POL regulator (in this case regulator 2).

Intelligent Management of a Current Sharing Group

One or more additional algorithms may also be devised to further improve the performance of a current sharing group. The algorithm(s) may include the following:

1. A psuedo-masterless master-slave form of current balancing configuration, in which all member devices autonomously arbitrate a new master assignment, should the current master device drop out of regulation for any reason.
2. Efficiency improvements based on a system parameter level, such as duty cycle or output current, for example. The improvements may include both a method of autonomously adding and dropping phases, and a method of adjusting the switch frequency to the system.

3. Minimizing switch loss and output ripple by a method of redistribution of the member phases evenly spaced about the unit circle, based on the number of active members.
4. Autonomously recovering a single member after its fault condition has expired.

The Algorithm(s) may be implemented to perform the management of the current sharing group over the digital bus (e.g. bus 120 in FIG. 7) as previously described.

Present day systems do not provide means for autonomously redistributing the assigned master over a device-to-device communication method, which allows the system to remain stable and active if any device fails. There are however many benefits to autonomously adding and dropping phases while redistributing group member phase alignments relative to one another, and adjusting the performance of a current sharing group managed by the group, in response to reading a system parametric.

Figures 22, 23:
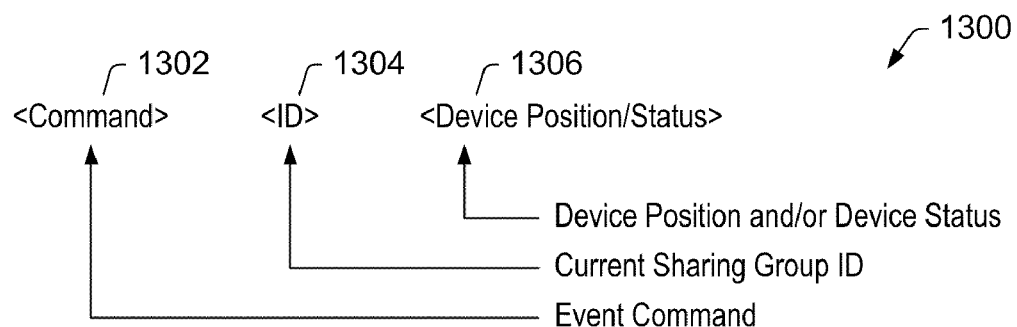
FIG. 22 shows a table highlighting one possible sample data structure that might be defined for current sharing programmability.
FIG. 23 shows one example of communication between regulators on the communications bus where a Command may define the event action.

A current sharing group of POL devices/regulators may be configured in a number of ways. FIG. 22 shows a table highlighting one possible sample data structure that might be defined for current sharing programmability. Configuration through a communication bus for a masterless algorithm may depend on the programming of the unique device identifier, such as either an ID or an address, which may be used within the communication bus protocol. In the example shown, a 5-bit current sharing group ID or address may be defined. Of course the number of bits may depend on the number of POL devices in the group, and may be greater than 5 bits or lower than 5 bits. In addition, the number of devices within a group, the position or order number within the group may all be specified. Furthermore, actions may also be communicated over the bus, such as adding/dropping a phase, autonomously recovering from a fault, and enabling a current sharing algorithm.

FIG. 23 shows one example of communication 1300 where a Command 1302 may define the event action, such as dropping/adding a phase, an ID 1304 may denote the current sharing group unique identifier, such as an address or an ID, and a Device Position/Status 1306 may associate the individual device with its status, such as device dropping phase, for example. In this embodiment, the designation of a first (or initial) master device may be user-determined, for example by programming the devices with unique positions. For example, if there are four devices configured in a current share configuration, then the device with position 0 may be designated as the initial master device, while devices programmed with 1, 2, and 3 may initially be slave devices. In one set of embodiments, the POL devices may be pin-strapped, and during operation they may infer their position from their communication address where, for example, a device with address 0x20 of the bus (e.g. SMBus) address space may translate to position 0 as defined from the low order bits. Once a new master has been declared, the new master may request a signal from all the active members, where the signal may be indicative of the phase offset of each member as a result of the new configuration. By sending the new phase, the master may calculate what phase each member ought to be and compare to the received information. In addition, transmission of the phase may imply the members are aware and cognizant of the group.

In one set of embodiments, a master-less algorithm may be configured to manage the current sharing communication between members of the current sharing group, and also implement fault management and fault response within the current sharing group. In one set of embodiments, current sharing groups may be configured with multiple devices which may be programmed such that one device is designated as an initial master device of the current sharing group while the other devices are designated as initial slave (or member) devices. In another set of embodiments, the devices may be programmed such that the group might autonomously designate a master device. The master device may actively transmit first information indicative of the value/status of current over a communication bus (e.g. I$^2$C, SMBus, or some other communication bus), with the member/slave devices using that information to adjust their GH control signal duty cycle value to balance the current loading of each device in the system. The master device may continue to transmit the first information until a fault occurs, its phase is dropped, or its communication interface fails, at which time the slave members in the group may arbitrate a new master device.

A pseudo-masterless master-slave algorithm may therefore be defined as an algorithm that operates to designate at least one device as a default master device in a device-to-device system that includes multiple devices, and designates the other devices as default slave devices to the master device. The pseudo-masterless aspect refers to an ability of the system to always include at least one device designated as a master device, without any of the slave device explicitly requesting to become master devices on the bus, through the ability to arbitrate (i.e. designate based on certain criteria that may include priority information) a new master device in the event the designated default master device ceases functioning. In one embodiment, all member devices of a current sharing group track the status of other members of the group with a status vector. This vector may be used to track the current master (which may be the default master, for example), according to a lowest active position or some other addressing scheme, for example. Additionally, the default master device of the system may be defined as the lowest programmed position (i.e. the device having the lowest device ID among devices in the current sharing group).

Each member of a current sharing group may have an initial configuration (i.e. each POL device member of a current sharing group may be configured prior to operation). Each member may be configured with a current sharing group ID (again, refer to FIGS. 22 and 23), which may allow multiple groups to use the same communication bus. Additionally, each member of a current sharing group may be configured with (or may store) information indicative of the number of devices that are configured in the current sharing group, and information indicative of the device's own unique position within the group. During voltage/current regulation, each member may keep track over the communication bus of both how many members are actively current sharing the output voltage, and which device is the presently designated master. Any device that either adds itself to the group or drops out of the group may communicate over the data bus its group ID, its current status (add or drop) and its position.

Figure 24:
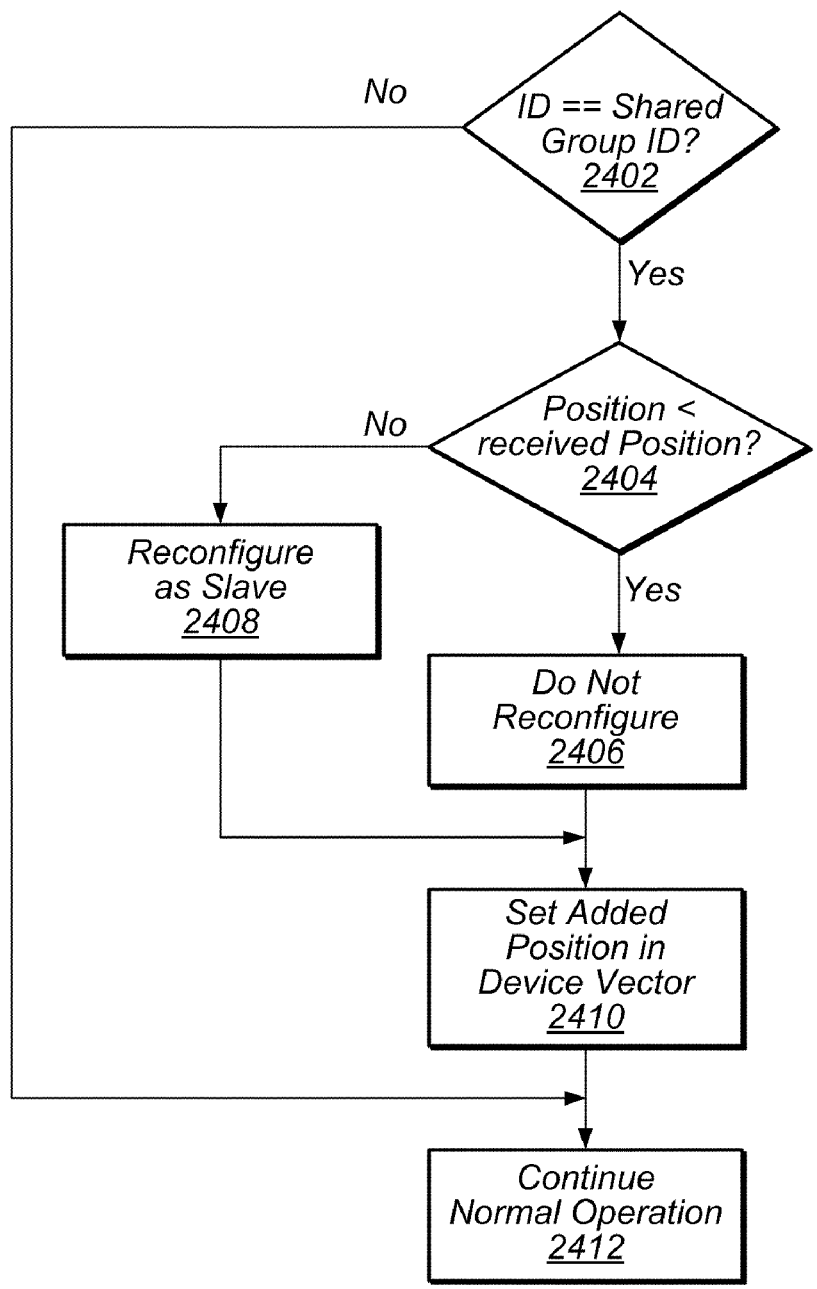
FIG. 24 shows a flowchart illustrating one embodiment of a method for POL devices configuring themselves within a current sharing group when adding a phase.

FIG. 24 shows a flowchart illustrating one embodiment of a method for POL devices configuring themselves within a current sharing group when adding a phase, i.e. when a POL regulator is to be enabled/activated to provide additional current in the current sharing configuration. All devices attached to the communication bus may determine if a transmitted packet is relevant to them by comparing the received group ID to their programmed group ID (2402). In other words, each device may first determine if it is part of the current sharing group for which the transmitted packet is intended. If the IDs match, then the receiving device may evaluate the status of the group member that transmitted in the packet. If the device is adding itself to the group, then the positions may be compared (2404). If the received position is lower than the programmed position of the receiving device (i.e. if the received information is indicative of a position that is lower then the programmed position of the receiving device) then the receiving device may (re)configure itself as a slave device (2408). If the received position is higher than the programmed position, the receiving device may not need to reconfigure itself (2406). The receiving device may then set/clear a respective position bit in a device vector to indicate that the device corresponding to the received position has been added to the current sharing group (2410), and continue normal operation if the packet is received during normal operation (2412), or begin operation if the current sharing group is just being powered up (2412). If the device position of the receiving device is the lowest of all active devices, then it may configure itself as the master device instead of not reconfiguring itself (in 2406).

Figure 25:
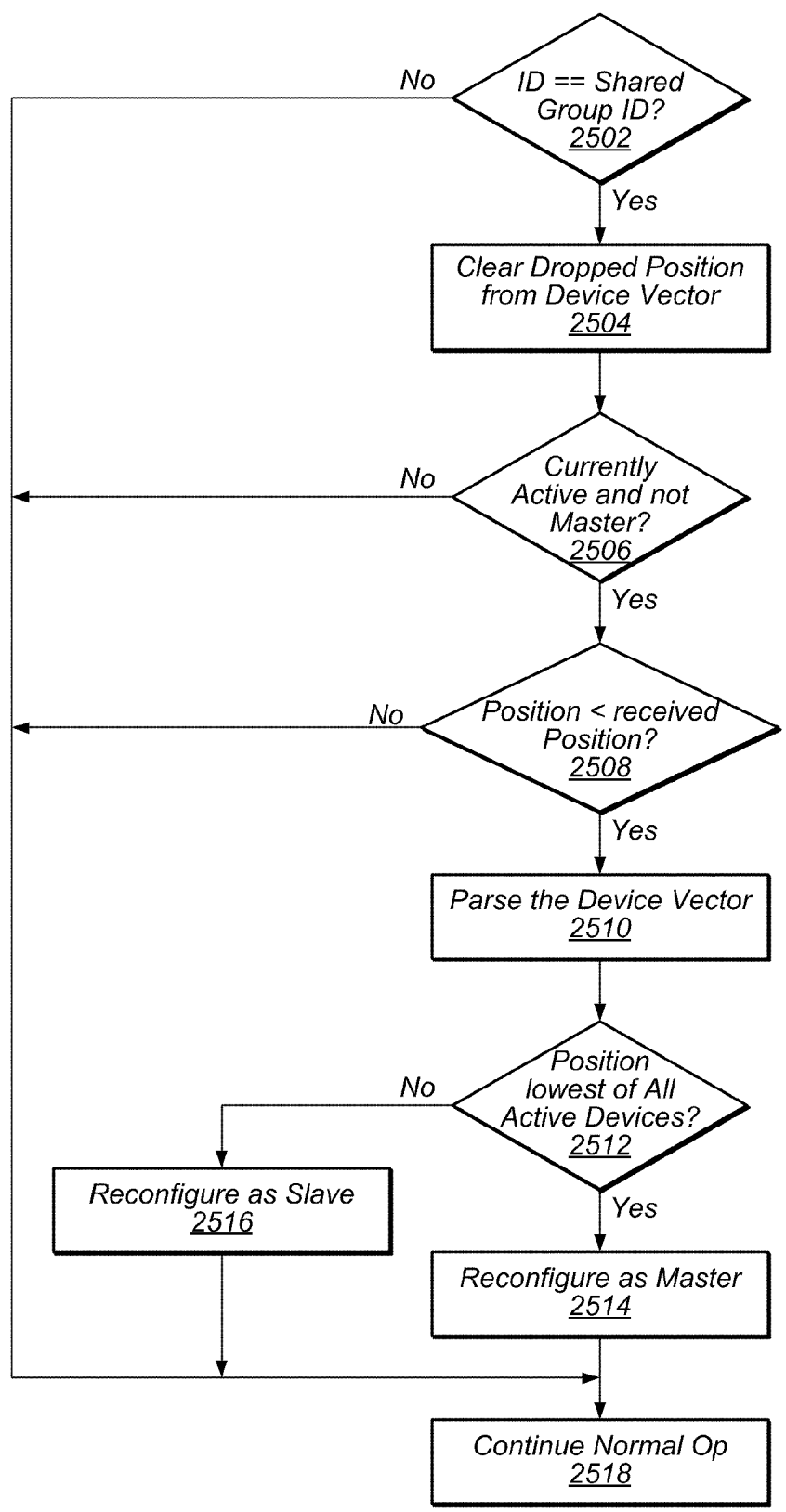
FIG. 25 shows a flowchart illustrating one embodiment of a method for POL devices configuring themselves within a current sharing group when dropping a phase.

FIG. 25 shows a flowchart illustrating one embodiment of a method for POL devices configuring themselves within a current sharing group when dropping a phase, i.e. when a POL regulator is to be disabled/deactivated from providing a member current in the current sharing configuration. Again, all devices attached to the communication bus may determine if a transmitted packet is relevant to them by comparing the received group ID to their programmed group ID (2502). If the received (status) information in the transmitted packet indicates that the sender is dropping its phase, then the receiving device may first set/clear in its device vector the bit corresponding to the transmitting device to indicate that the device corresponding to the received position has been dropped (2504). The receiving device may then determine whether it [the receiving device] is currently active and operating as the master device (2506), and if it is, it may continue normal operation (2518). If the receiving device determines that it is currently active and is not the master device, it may then compare whether the received position is lower than the receiving device's programmed position (2508), and if it is, the receiving device may continue normal operation (2518). Otherwise, the receiving device may parse the device vector (2510) to determine its own position within all active devices (2512).

If the receiving device determines that its position is not the lowest of all active devices, it may (re)configure itself (or if it already is, remain) as a slave device. However, if the receiving device determines at this point that its position is the lowest of all active devices, it may reconfigure itself as the master device (2514), then resume normal operation (2518). Overall, if the received position is indicative of the present master device having dropped out, the next lower positioned member may assume the master responsibilities. It should also be noted that the flowcharts in FIGS. 24 and 25 are specific to priority between devices being determined by the relative value of the ID of one device with respect to the ID of another device within the current sharing group. Whether a device ought to (re)configure itself as a master or slave when adding/dropping phases may equally be determined according to any specified or predetermined or programmable criteria different from relative position, while adhering to the operating principles disclosed herein.

The efficiency of the current sharing configurations may also be improved. For example, the current sharing group may also be configured to autonomously detect light loads, or a host processor (central controller) may provide a light load control signal or communication. Efficiency may be recovered in current sharing groups through one or more of the following actions: dropping phases at light output loads and/or reducing the switch frequency. Dropping phases may increase efficiency in at least two ways. First, dropping phases may increase the current supplied by the remaining active members, which may shift their efficiency curves higher, thereby increasing the cumulative efficiency of the group. Second, dropping phases may reduce the effective switch rate of the system, which may reduce/minimizes the loss due to the rate of switching the FETs on and off (i.e. due to the rate at which the FETs are switched on and off). Simply reducing the switch frequency may consequently also minimize the loss due to the rate of switching the FETs on and off.

By reading parametric information (i.e. information indicative of certain parameters), such as duty cycle and/or output current, the current sharing group master may determine whether to attempt to increase efficiency by adjusting either the number of active members of a current sharing group, or whether to adjust the switch frequency up or down. As previously indicated, ideally, the duty cycle may correspond to the input voltage divided by the desired output voltage. A device with either the ability to measure its duty cycle or somehow discern its duty cycle may be able to intelligently determine which parts of its system ought to be optimized. If the measured duty cycle is greater than the ideal duty cycle, then the loading may be higher than the discontinuous region, where discontinuous region refers to the region where the output load current ripple may cross the zero boundary. Therefore, if the measured duty cycle of the current sharing group's present master device is less than a specified (expected, or ideal) value, then the master device may adjust either the switch frequency of the system or the number of active members in an attempt to increase the group efficiency. The adjustment of the switch frequency may be performed according to a search algorithm, such as a successive approximation register (SAR) routine. The adjustment process may continue until the duty cycle and/or output current trend continues, or specified threshold value(s) of the duty cycle and/or the output current are exceeded, and the master POL regulator of the current sharing group begins to reverse the efficiency gain adjustments. In one set of embodiments, efficiency may be increased by adding and dropping phases, and/or reducing the frequency of the shared clock source between the members of the group. The clock source may or may not be sourced by one of the member devices. However, the clock source may be adjustable through some form of control, for example over the data communication bus (e.g. bus 120 in FIG. 7).

Performance gains—for example a higher effective switch rate, minimized output ripple, and efficiently drawn current from the bus voltage supply—in a current sharing system, may be realized through equal distribution of phases about the unit circle. For example, a system with a specified number of devices (e.g. four devices) might position the phasing of each device offset by a same amount, (e.g. in the case of four devices by 90 degrees). In one set of embodiments, the phases may be autonomously distributed in a current sharing group based on the number of active members at any given time. Because member POL devices may be added or dropped, and member devices may experience fault conditions for a variety of possible reasons, the remaining, active devices may be configured to autonomously redistribute their phase distribution.

Figure 26:
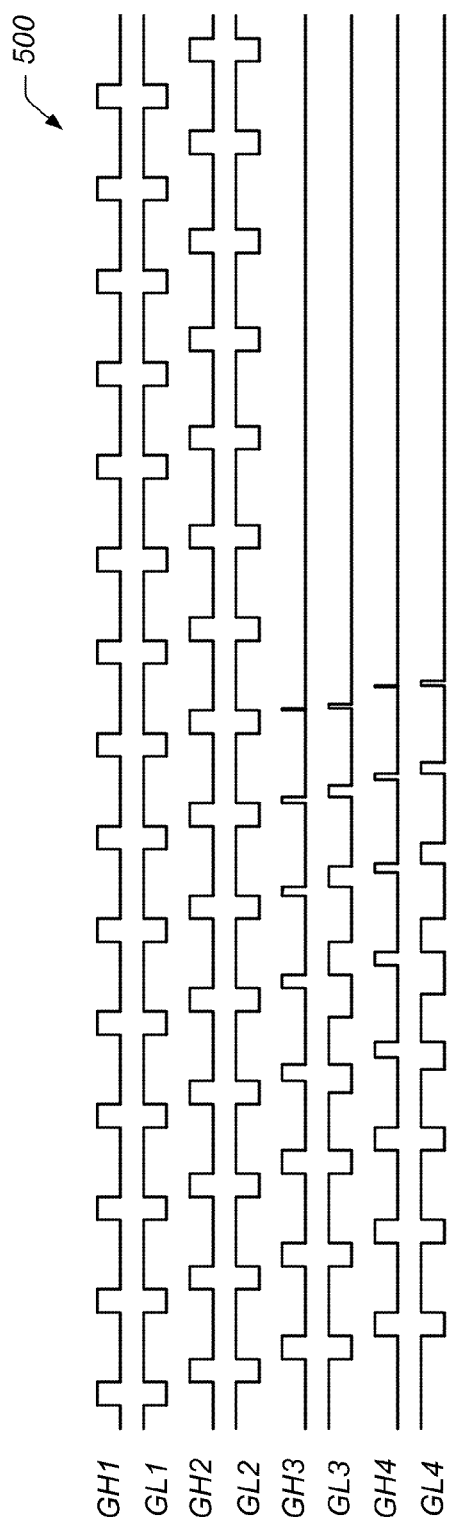
FIG. 26 shows the gate signals for four POL devices in a current sharing group where each phase is associated with one set of gate signals, with the third and fourth phases being dropped and the second phase redistributing itself to a different offset from the first POL device.
Figure 27:
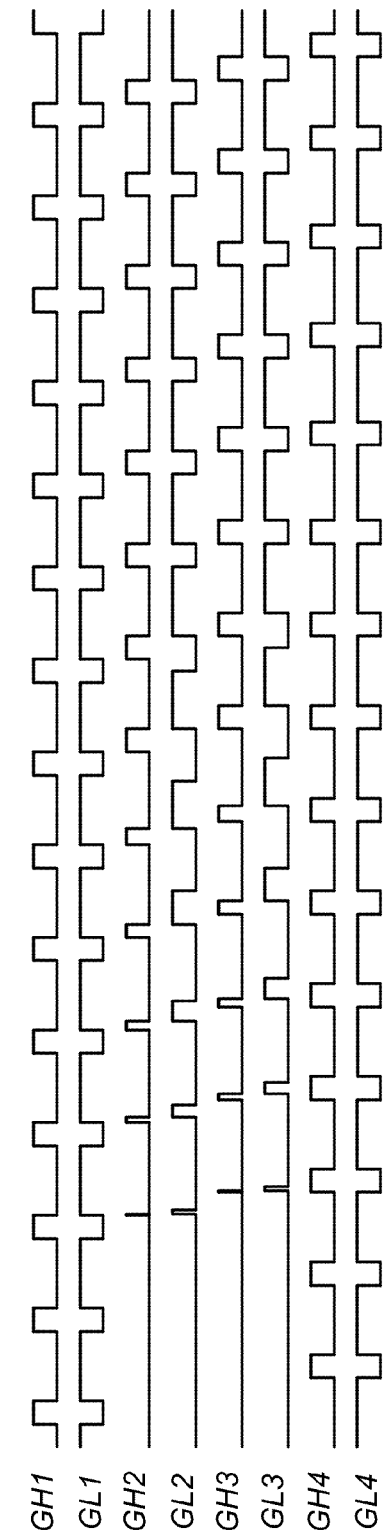
FIG. 27 shows the gate signals for four POL devices in a current sharing group where each phase is associated with one set of gate signals, with the second and third phases being added, and the fourth phase redistributing itself to a different offset from the first POL device.

All members of a current sharing group may track the status of other members of the group via a status vector. The status vector may be configured to store information indicative of what phase offset the member device ought to adhere to according to certain specifications. For example, the lowest numbered device (i.e. the device having the lowest ID number relative to the other devices) might be at a 0 degree offset, while the other device may be interleaved based on relative position (with respect to the other devices), the total number of active devices, and some degree of quantization based on the device hardware capability. FIG. 26 shows the gate signals for four devices in a current sharing group where each phase is associated with one set of gate signals GH and GL, followed by the phase number (1-4), leading to gate signals GH1-GH4 and GL1-GL4, respectively. All the phases may be initially offset by 90 degrees about the unit circle. Phase 1 may be located at 0 degree, phase 2 may be located at 90 degree, phase 3 may be located at 180 degree and phase 4 may be located at 270 degree. When phase 3 and phase 4 are dropped (for whatever reason), it may cause phase 2 to redistribute its phasing from 90 degree offset from the phase 1 anchor to 180 degree offset from the phase 1 anchor, as shown in FIG. 26. FIG. 27 also shows the gate signals for four devices in a current sharing group similar to what is shown in FIG. 26. In this case, phase 2 and phase 3 may be added back to the system, and phase 4 may redistribute itself from 180 degree offset to 270 degree offset as a result.

The current sharing group may also be configured in a number of ways for fault management within the group or within a larger system. In one embodiment, the current sharing group may be configured in a "last man standing scenario". That is, when an individual POL device within the current sharing group experiences a fault condition, it may not result in the entire current sharing group entering into a fault condition, but rather the individual device may simply drop out of the configuration. In another embodiment, the current sharing group may be configured to collectively enter into a fault condition when an individual device experiences a fault condition. In the last man standing configuration, a device may be configured to power down according to a set of specified conditions, such as a temperature or some other system anomaly. In that case, the device may remove itself from the current sharing group as if it were a dropped phase. In this way, the faulted device may not cause a transient on the output voltage. The device experiencing the fault condition may transmit a dropped phase event to the other current sharing members of the group, and all members may update their status vector with respect to the faulted device. However, once the fault has cleared, the device may be added back to the system. This may be performed autonomously by the individual device or as requested by the master device. In the event that a member either adds or drops from the group, the remaining members of the group may realign their phase offsets according to the status vector.

Method to Properly Ramp Current Sharing Rail

In one set of embodiments, the ramps of the output voltages of all member devices may be synchronized both in a stand-alone application, and a tracking application while reducing recirculating currents. Again, a digital communication bus configured between the member POL devices may be used to facilitate intelligent management of the POL devices and the current sharing group. In one embodiment, recirculating currents may be mitigated prior to ramping, by synchronizing the start of the ramps through a device-to-device communication method, while also ramping the duty cycle of the sync FET according to the duty cycle of the control FET signal, as suggested in the modulation circuits shown in FIGS. 17 and 19. Those circuits may also be used to synchronize the ramps of all the member devices to avoid output voltage fluctuations and to mitigate the large recirculation currents present in most current sharing systems.

Individual phase currents in a shared configuration may be determined by the intersection of the load voltage and the load line for that converter. During the soft-start period, the load lines for each converter may start low and may move toward the final load line position. Within some POL devices, e.g. microprocessor-based devices, there may be processing latencies, which may be manifested as perceived timing differences between the start of each device's output voltage ramp, which may appear as a significant difference in the load lines. Because each device is tied to the same load (by virtue of the current sharing configuration—see FIG. 7, for example, where the common load is exemplified by resistor 112), this may result in a significant difference in the load lines until the end of the ramp is reached for the master device and member/slave device(s).

FIG. 28 illustrates two ramps: the output voltage ramp of a master device and the output voltage ramp a member/slave device, with the ramp of the member device starting significantly sooner than the ramp of the master device. For ease of understanding, the ramp of only one slave device is shown in FIG. 28. Diagram 2800 illustrates the output voltage plotted versus time, while diagram 2802 illustrates the output voltage plotted versus the output currents and overall load current. At time point "t", the member load line is closer to the final load line output voltage value (represented as the horizontal line) than the master load line. This may result in a significant mismatch between the member/slave current and the master current. In fact, as shown in diagram 2802, the system behavior may reflect the master current being negative (boost mode) while the member/slave current is positive (buck mode). The horizontal line in diagram 2802 represents the load voltage at time "t".

Because the load current is the sum of the currents from both converters, if one converter sinks current, the other converter(s) may be required to source more current than what is actually required by the load. FIG. 29 illustrates a more desirable load line relationship between the load line of a master device and the load line of a slave device, where the currents are more balanced. Diagram 2900 illustrates the output voltage plotted versus time, while diagram 2902 illustrates the output voltage plotted versus the output currents and overall load current. The ramp of multiple current sharing devices may be configured with a number of additional settings to mitigate the amount of recirculating currents. As shown in FIG. 29, at time "t", the member load line and the master load line are almost the same distance away from the final load line output voltage value (represented as the horizontal line). This may significantly reduce and/or eliminate any significant mismatch between the member/slave current and the master current. As shown in diagram 2902, the system behavior may reflect the master current and the member/slave current both being positive (buck mode). The horizontal line in diagram 2902 again represents the load voltage at time "t".

Figure 30:
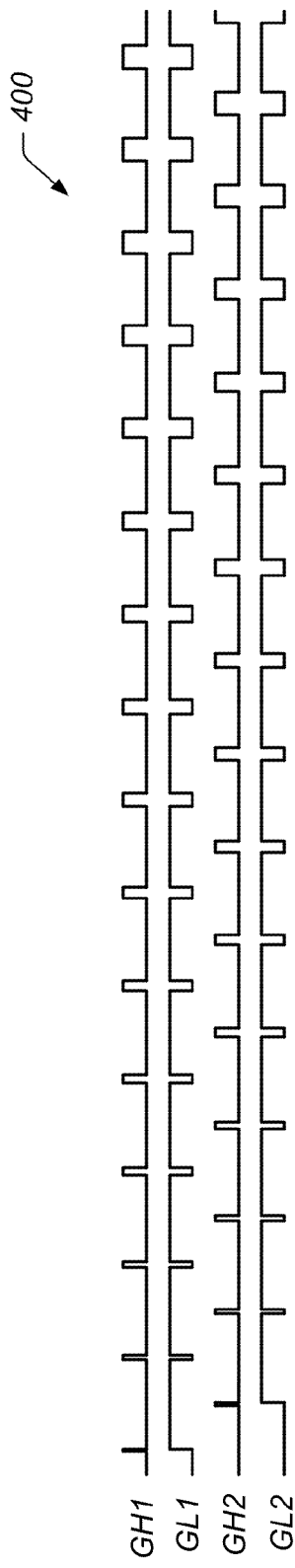
FIG. 30 shows a signal diagram illustrating gate signals for a master device and a slave device, where a hardware trigger mechanism allows the devices to begin ramping the output voltage.

As previously mentioned, to obtain the desired results illustrated in FIG. 29, the ramp start timing may be synchronized through communication over a digital communication bus, while the pulse width of the control signal to the synchronous FET may be modulated during the ramping period. When synchronizing the timing of the start of the ramps of all members of a current sharing group, a master and slave type configuration may again be employed. A device may initially be configured as a master device (for example as described above) and all other members may be configured as slave devices to that master. Once a system enable is asserted and detected by all the members of the current sharing group, the slave POL devices may set up all the hardware necessary for a ramping to begin, and may wait in idle mode until the master device transmits a start ramp packet. Once a specific time period required from the assertion of a system enable to the desired start of the ramp has expired, the master device may transmit a second packet over the communication bus to all members of the current sharing group for the members to begin ramping their respective output voltages. The second packet may effect a hardware trigger mechanism to allow the devices to begin ramping the output voltage as illustrated in FIG. 30. As shown in FIG. 30, a first set of gate signals, GH1 and GL1, may correspond to a master device, while a second set of gate signals, GH2 and GL2, may correspond to a slave device. It should also be noted that since the master device is also a member of the current sharing group, it too may respond to the second packet to begin ramping its own output voltage. In the example shown in FIG. 30, the master device and slave device operate 180 degrees out of phase with respect to each other.

In addition, a modulation circuit (e.g. the modulation circuit shown in FIG. 17) may be used on the respective GL signals of the devices within the current sharing group to help ramping the respective output voltages of the devices within the current sharing group by reducing as much recirculating currents in the system as possible. The modulation of GL may reduce the large output currents that may be present within a power stage filter with numerous controllers configured in a current sharing group driving numerous FETs with slightly mismatched controller FET duty cycles. The duty cycle of GL may determine the amount of current that may be discharged to ground via the sync FET.

Figure 31:
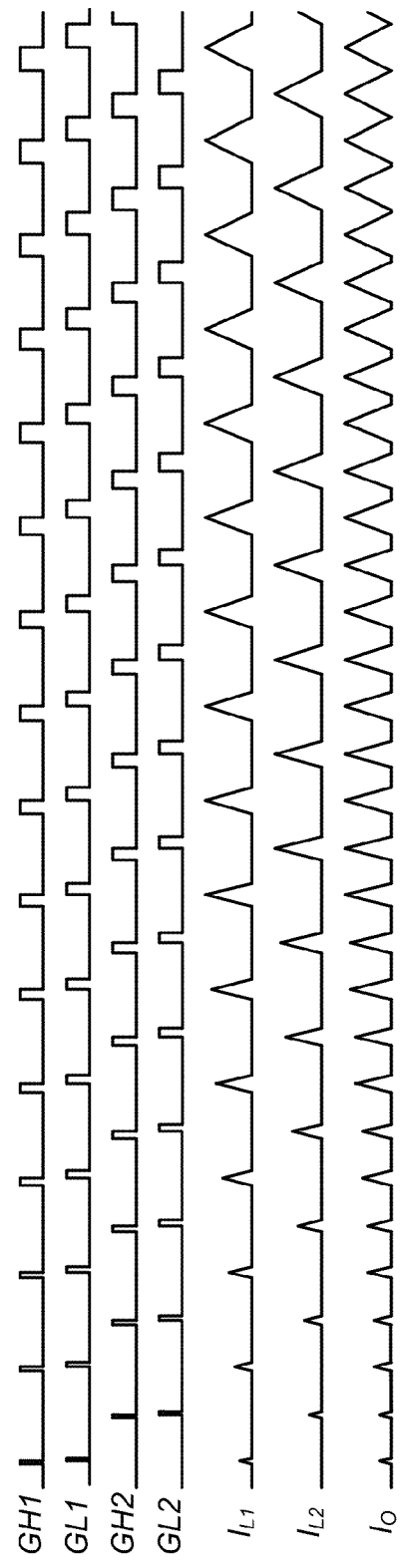
FIG. 31 shows a signal diagram illustrating gate signals for a master device and a slave device, with the duty cycle of GH time delayed and the delayed GH signal is duplicated at the output stage as the GL signal.

The modulation circuit may be configured in a number of ways. In one embodiment, the member devices of a current sharing group may configure current thresholds (i.e. threshold values for the output current) corresponding to an intermediate level, an over-current level, and an under-current level. If any of those thresholds are exceeded, the modulation circuit may dither the duty cycle of the sync FET. By dithering the duty cycle of the sync FET, the member device may restrict the amount of current discharged through the inductor. Also, the duty cycle of the high-side FET may be time delayed and duplicated on the output as the pulse width of the sync FET, as shown in FIG. 31. This may restrict the amount of current discharged through the inductor by the amount of current passed to the output through the inductor for each member of the current sharing group. In addition, a minimum low-side duty cycle may be programmed for the duration of the ramping process, as previously shown in FIG. 18 (see also the accompanying description above). Finally, a controller configured within the POL regulator (e.g. a microcontroller or microprocessor) may be used to determine the necessary duty cycle of the sync (low-side) FET based on a system parameter, such as duty cycle or output current.

Figure 32:
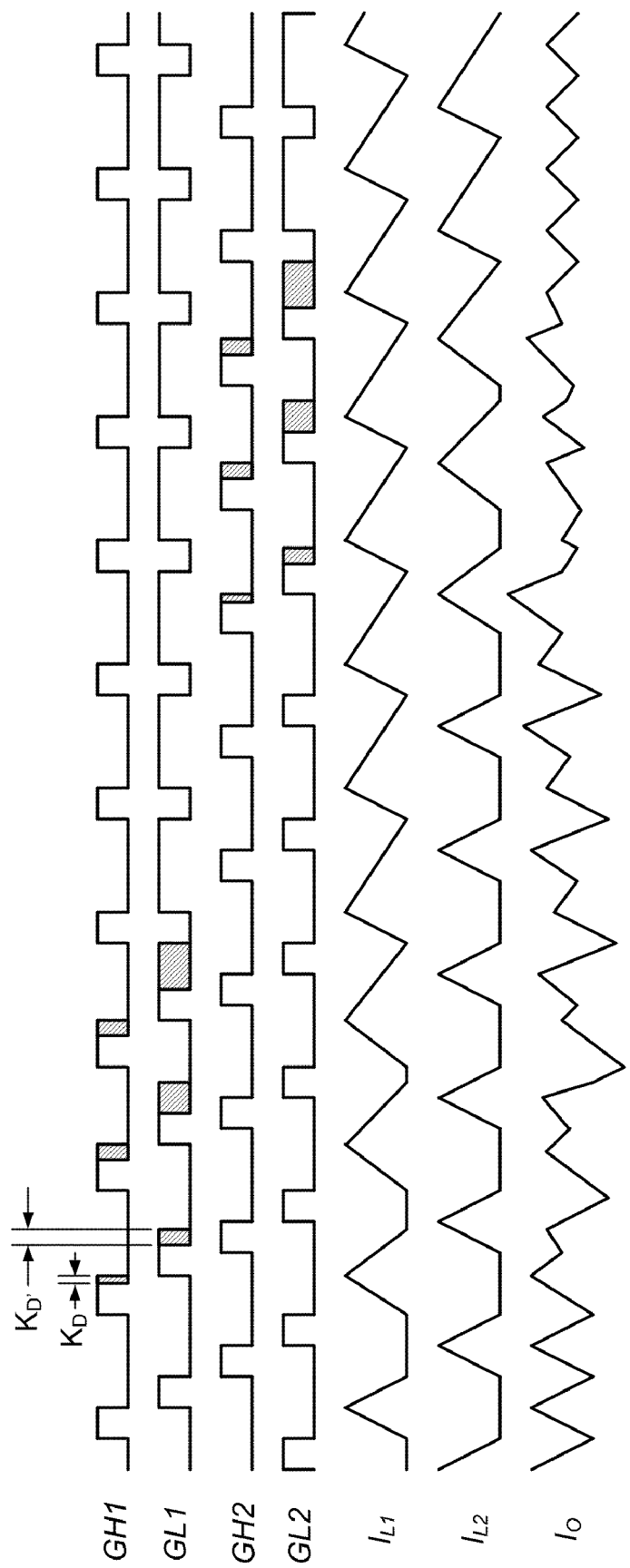
FIG. 32 shows a signal diagram illustrating gate signals and output currents for two regulators in a current sharing configuration, with the slave devices releasing GL duty-cycle to obtain a GL signal that is an inversion of the GH signal.

Modulation circuit 17 may be programmed to completely modulate the GL pulse away, or a minimum pulse width may be programmed, as shown in FIG. 18. In some cases, the power system may not be operated in an asynchronous mode. The possible range for modulation may be defined between a minimum pulse width setting to the rising edge of GH. However the effective modulation range may be the duty cycle of the GL pulse itself. Once the desire output voltage has been reached and a signal or packet is transmitted to indicate that the current sharing group is operational, the devices may begin to release the low-side FET duty cycle to the expected inversion of the high-side FET duty cycle or D'=1−D where D=Vout/Vin. FIG. 32 shows the gate signals and output current waveforms illustrating how the slave devices may release the low-side FET duty cycle to obtain instead the expected inversion of the high-side FET duty cycle.

A circuit (e.g. a circuit such as the one shown in FIG. 19) may be used for simultaneously manipulating the pulse widths of both the high-side and low-side FET gate signals. As previously mentioned with respect to the embodiment of FIG. 19, this may be accomplished by strobing an up counter and simultaneously scaling the gate drive signals to the typical boost converter output filter (e.g. the output stage shown in FIGS. 6 and 7).

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A system comprising:
   a communication bus; and
   a plurality of POL (point-of-load) regulators coupled to the communication bus, each POL regulator of the plurality of POL regulators having a respective output stage configured to provide a regulated output voltage to a common load to provide a respective output current to the common load, wherein each POL regulator is also configured to transmit and receive packets over the bus according to a bus communication protocol corresponding to the bus;
   wherein the plurality of POL regulators is configured to have one of the plurality of POL regulators operate as a master POL regulator and remaining ones of the plurality of POL regulators operate as slave POL regulators;
   wherein the master POL regulator is configured to transmit in a packet, over the communication bus, the digitized present value of the respective output current of the master POL regulator;
   wherein the slave POL regulators are configured to receive the digitized present value of the respective output current of the master POL regulator;
   wherein the plurality of POL regulators are configured to balance a current loading of each POL regulator of the plurality of POL regulators, through each respective slave POL regulator of the slave POL regulators adjusting a duty cycle of a respective control signal of a high-side field effect transistor (FET) in its output stage, based on a difference between the digitized present value of the respective output current of the master POL regulator and a digitized present value of the respective output current of the respective slave POL regulator.

2. The system of claim 1, wherein each POL regulator comprises a control loop to control its regulated output voltage, wherein each POL regulator is configured to use the control loop to respond to a transient event simultaneously with other POL regulators of the plurality of POL regulators; wherein the control loops of the plurality of POL regulators are phase interleaved with respect to each other.

3. The system of claim 1, wherein the master POL regulator is configured to transmit the digitized present value of the respective output current of the master POL regulator during each current sharing cycle, until one or more of:
   a fault occurs;
   a phase of the master POL regulator is dropped; or
   a communication interface of the master POL regulator fails.

4. The system of claim 3, wherein the slave POL regulators are configured to arbitrate a new master POL regulator when the master POL regulator is no longer transmitting the digitized present value of the respective output current of the master POL regulator.

5. The system of claim 1, wherein each POL regulator of the plurality of POL regulators is configured to control a slope of a load line curve of the POL regulator with respect to the common load, to calibrate for physical parasitic mismatches between each POL regulator of the plurality of POL regulators, and to calibrate for physical parasitic mismatches between the respective output stages of the plurality of POL regulators.

6. The system of claim 1, wherein each POL regulator of the plurality of POL regulators is configured to adapt its respective targeted output voltage to an operating point based on:
- an added line resistance (droop resistance) in the POL regulator's output stage;
- the respective output current provided to the common load by the POL regulator; and
- the information indicative of the value of the respective output current of the master POL regulator.

7. The system of claim 1, wherein each POL regulator of the plurality of POL regulators comprises a respective control feedback path configured to control the respective output voltage of the POL regulator, wherein the respective control feedback path is represented by the equation:

$$V_{out}=V_{ref}+V_{trim}(n)=V_{ref}+R_{droop}*(I_{Master}-I_{Member})*K_S+V_{trim}(n-1);$$

wherein:
- $V_{out}$ is the respective output voltage of the POL regulator;
- $V_{ref}$ is a reference voltage;
- $V_{trim}(n)$ is a voltage amount by which the POL regulator increases or decreases its respective output voltage during a present cycle of the respective control signal;
- $V_{trim}(n-1)$ is a voltage amount by which the POL regulator increased or decreased its respective output voltage during a most recent previous cycle of the respective control signal;
- $R_{droop}$ is an artificial line resistance (droop resistance) in the output stage of the POL regulator;
- $K_S$ is a predefined gain factor;
- $I_{Master}$ is the present value of the respective output current of the master POL regulator; and
- $I_{Slave}$ is the present value of the respective output current of the POL regulator.

8. The system of claim 7, wherein an amount by which the POL regulator increases or decreases its respective output voltage during any given current sharing cycle is limited to a specified maximum value.

9. The system of claim 1, wherein a communication rate between the master POL regulator and the slave POL regulators over the communication bus is specified such that a difference between the respective output currents provided to the common load by the plurality of POL regulators remains within a specified percentage of a total current conducted by the common load.

10. A point-of-load (POL) regulator comprising:
- an output stage configured to provide a regulated output voltage to a load, to generate a respective first portion of a total current conducted by the load; and
- a control loop configured to regulate the regulated output voltage based on:
  - a reference voltage;
  - an artificial line resistance (droop resistance) in the output circuitry;
  - a present value of a second portion of the total current, wherein the second portion of the total current is generated by a master POL regulator;
  - a present value of the respective first portion of the total current; and
  - an amount by which the POL regulator has previously increased or decreased the regulated output voltage.

11. The POL regulator of claim 10, wherein the control loop is further configured to regulate the regulated output voltage based on a predefined gain factor.

12. The POL regulator of claim 10, further comprising:
- a bus interface configured to transmit and receive data to and from a bus;
- wherein the POL regulator is configurable to operate as one of:
  - a slave POL regulator configured to receive through the bus interface the present value of the second portion of the total current; and
  - the master POL regulator configured to transmit through the bus interface the present value of the second portion of the total current.

13. The POL regulator of claim 12, wherein when the POL regulator is operating as the master POL regulator, the POL regulator is configured to continually transmit through the bus interface the present value of the second portion of the total current until one or more of:
- a fault occurs;
- a phase of the POL regulator is dropped; or
- the bus interface fails.

* * * * *